Jan. 31, 1967  J. DAUGHERTY  3,300,856
MACHINE TOOL WITH AUTOMATIC TOOL CHANGING APPARATUS
Filed Feb. 14, 1964  16 Sheets-Sheet 1
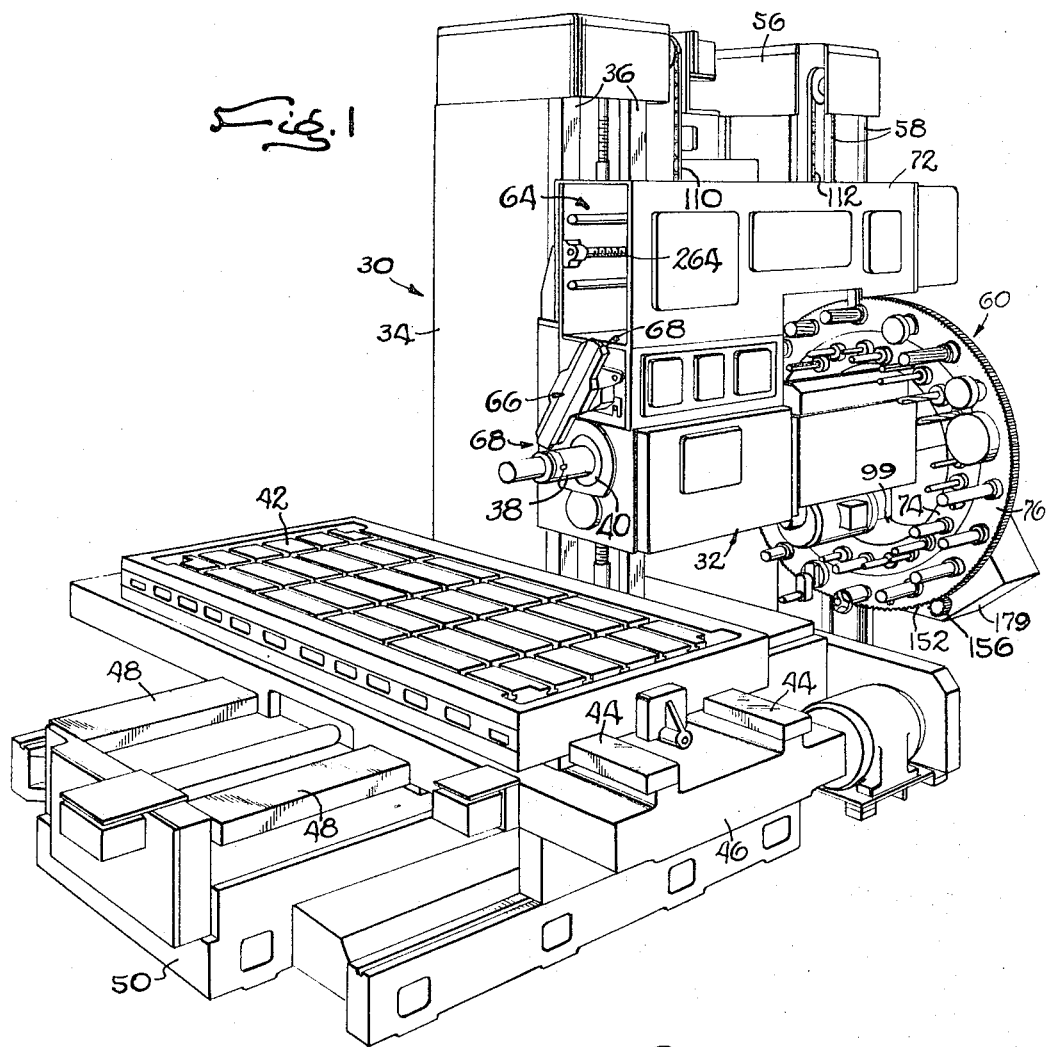
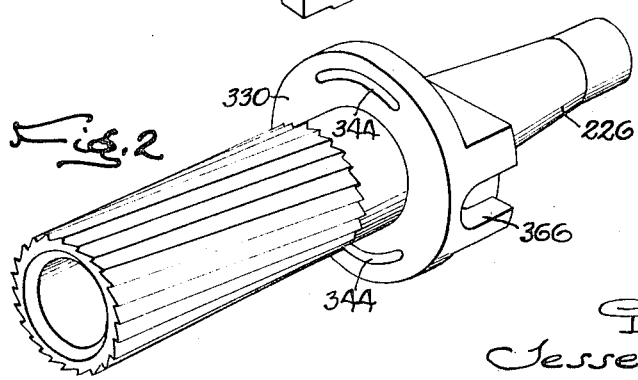
INVENTOR
Jesse Daugherty
Wolfe, Hubbard, Voit & Osann
ATTORNEYS

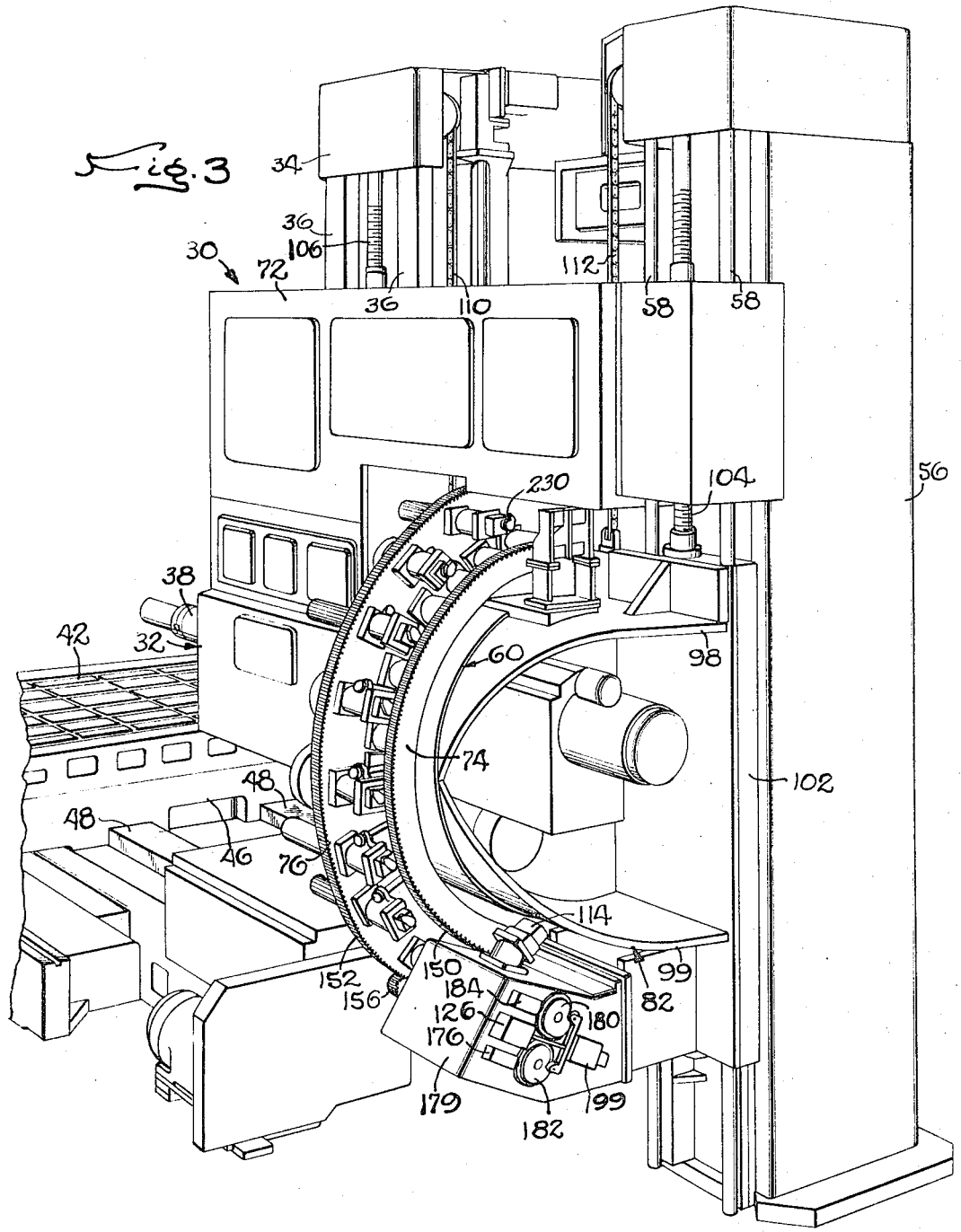

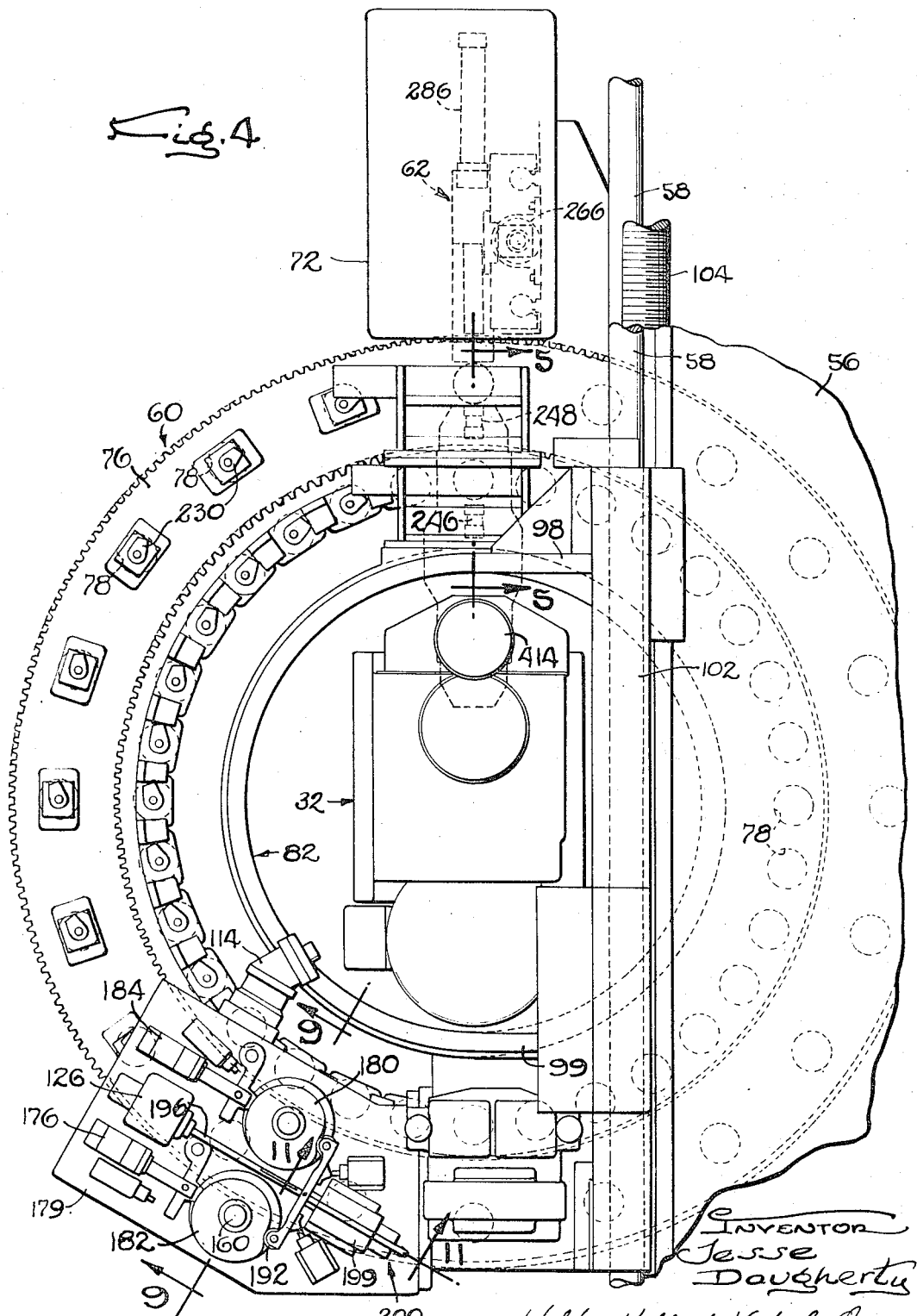

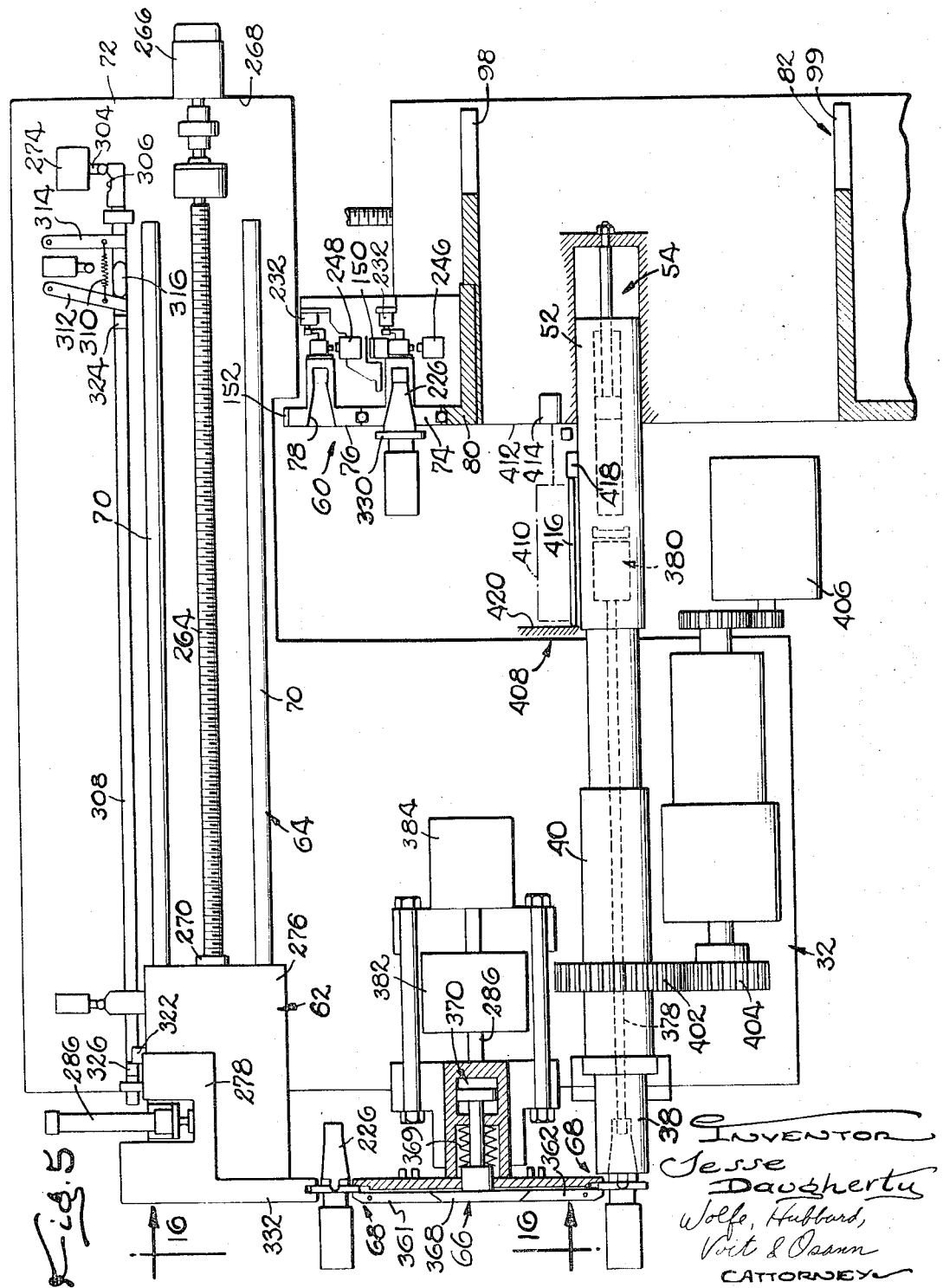

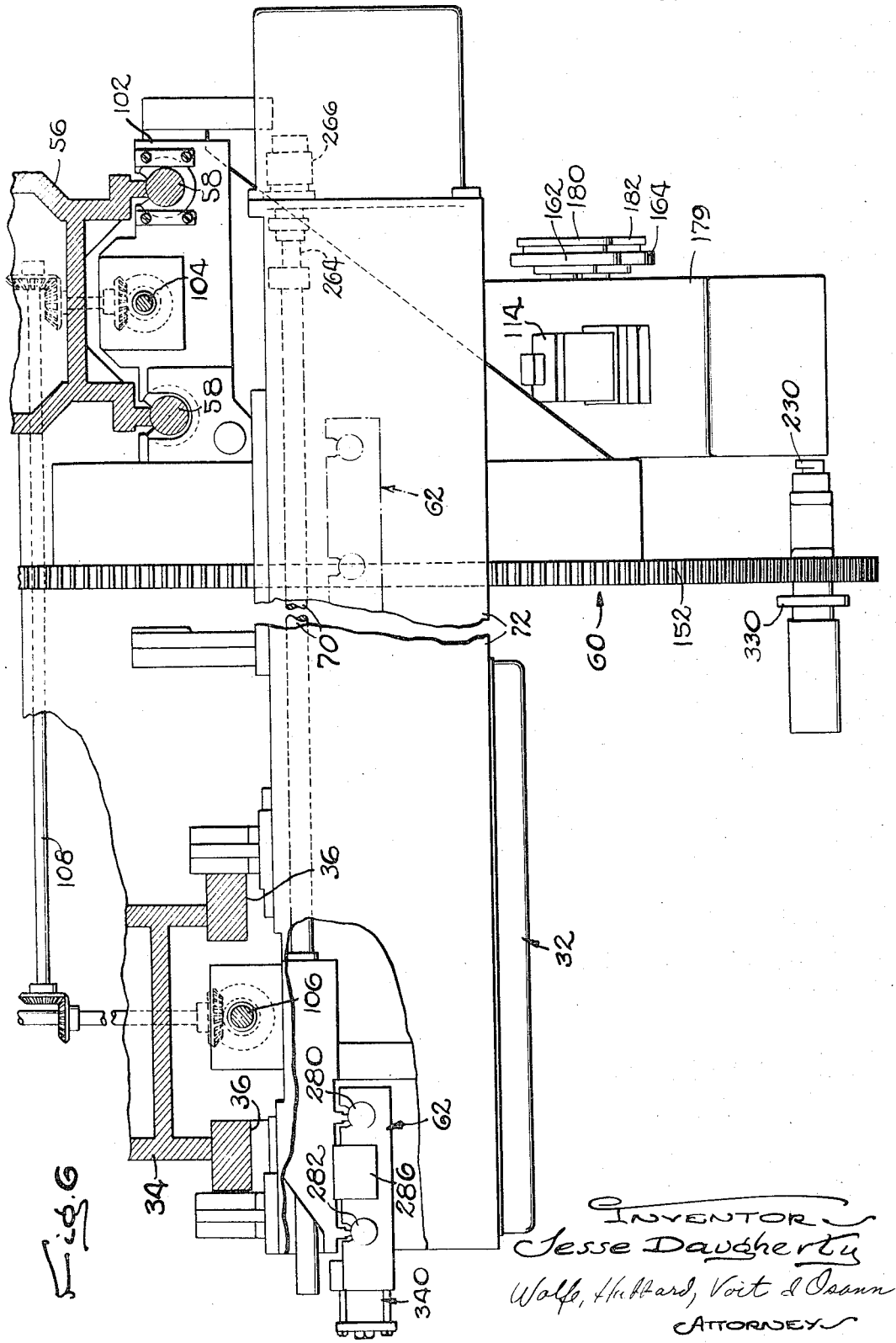

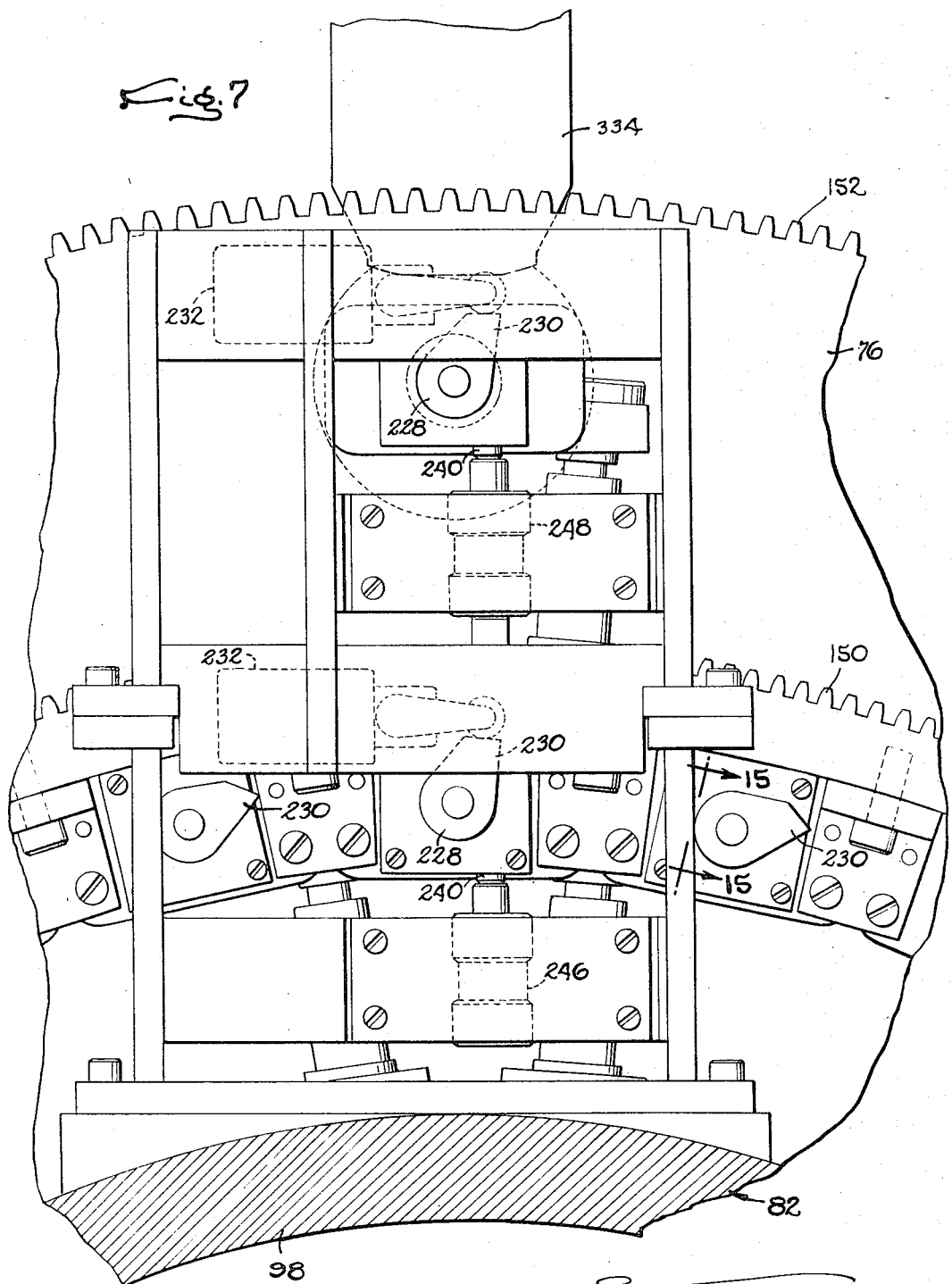

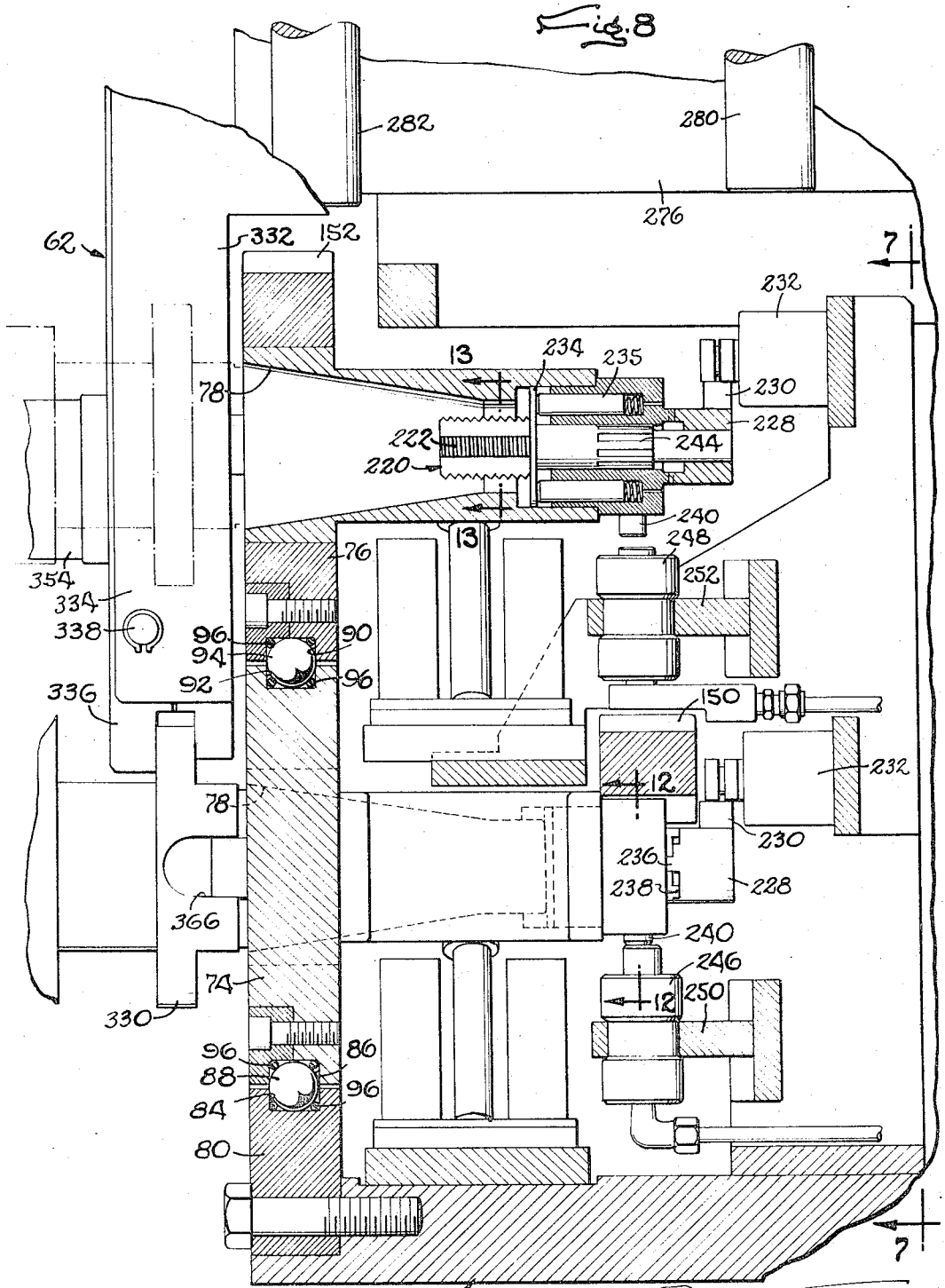

Jan. 31, 1967    J. DAUGHERTY    3,300,856
MACHINE TOOL WITH AUTOMATIC TOOL CHANGING APPARATUS
Filed Feb. 14, 1964    16 Sheets-Sheet 8
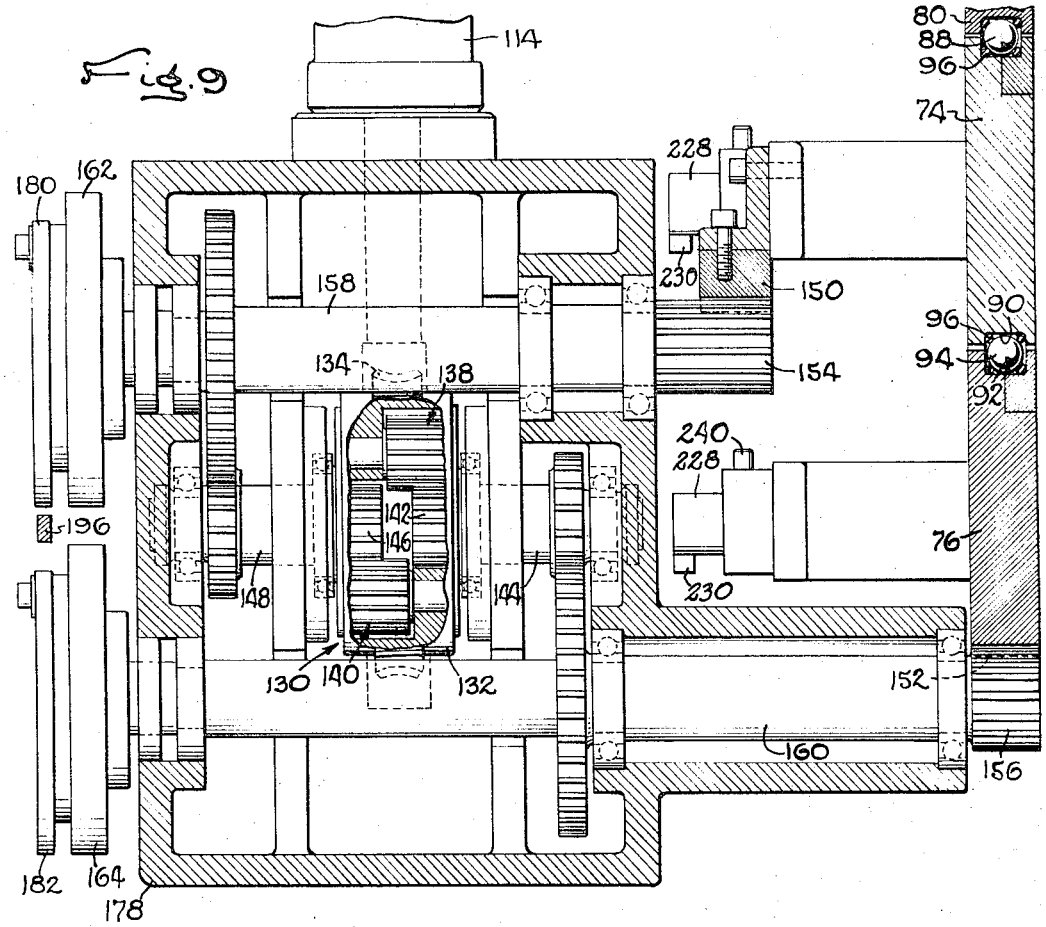
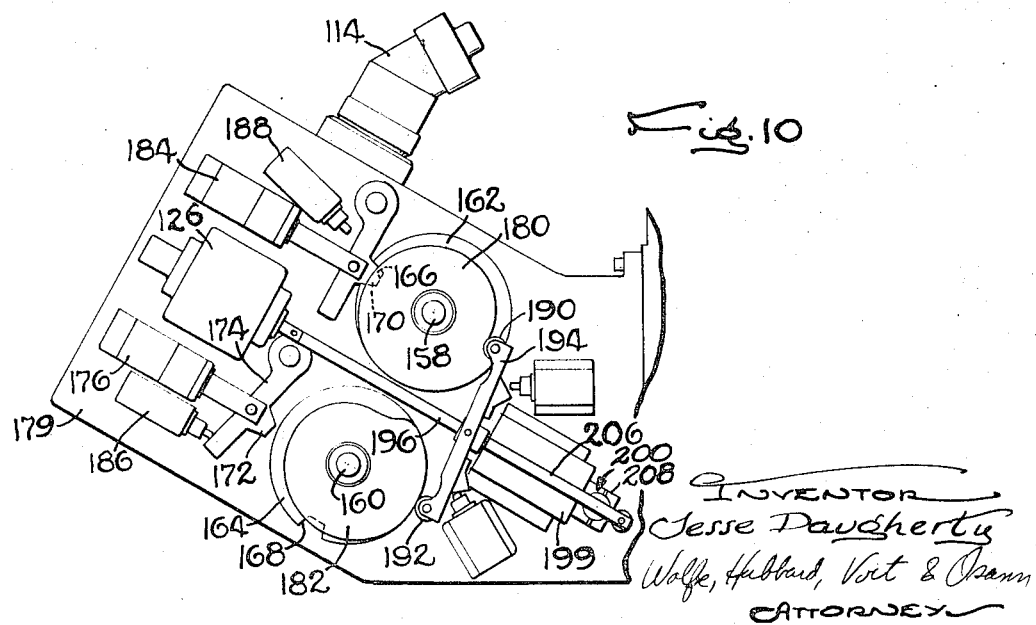

Jan. 31, 1967  J. DAUGHERTY  3,300,856
MACHINE TOOL WITH AUTOMATIC TOOL CHANGING APPARATUS
Filed Feb. 14, 1964  16 Sheets-Sheet 9
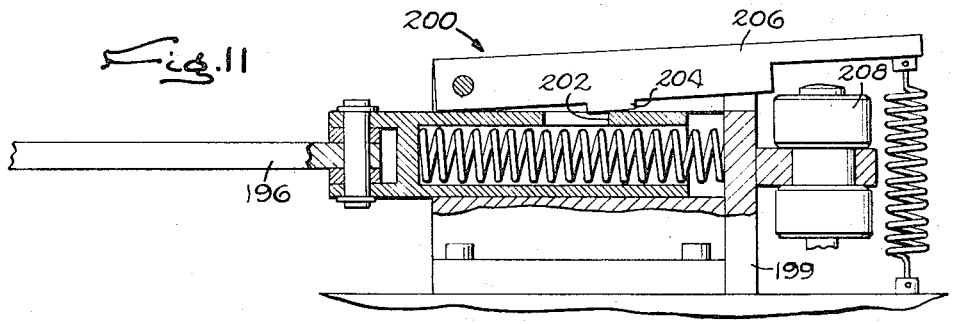
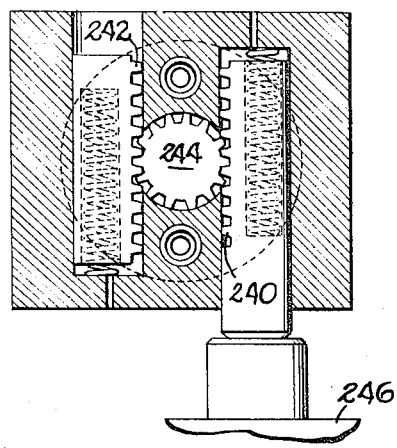
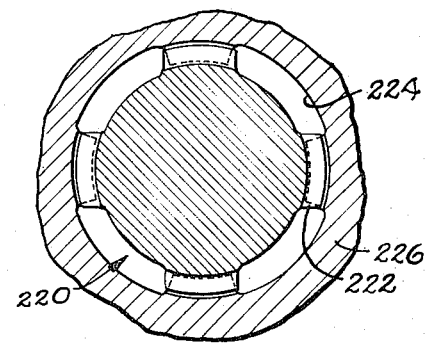
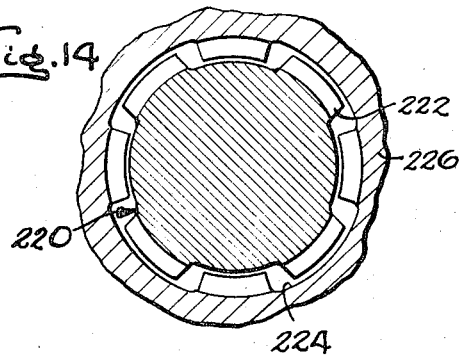
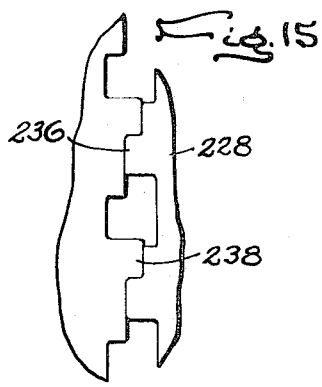
INVENTOR
Jesse Daugherty
Wolfe, Hubbard, Voit & Osann
ATTORNEY

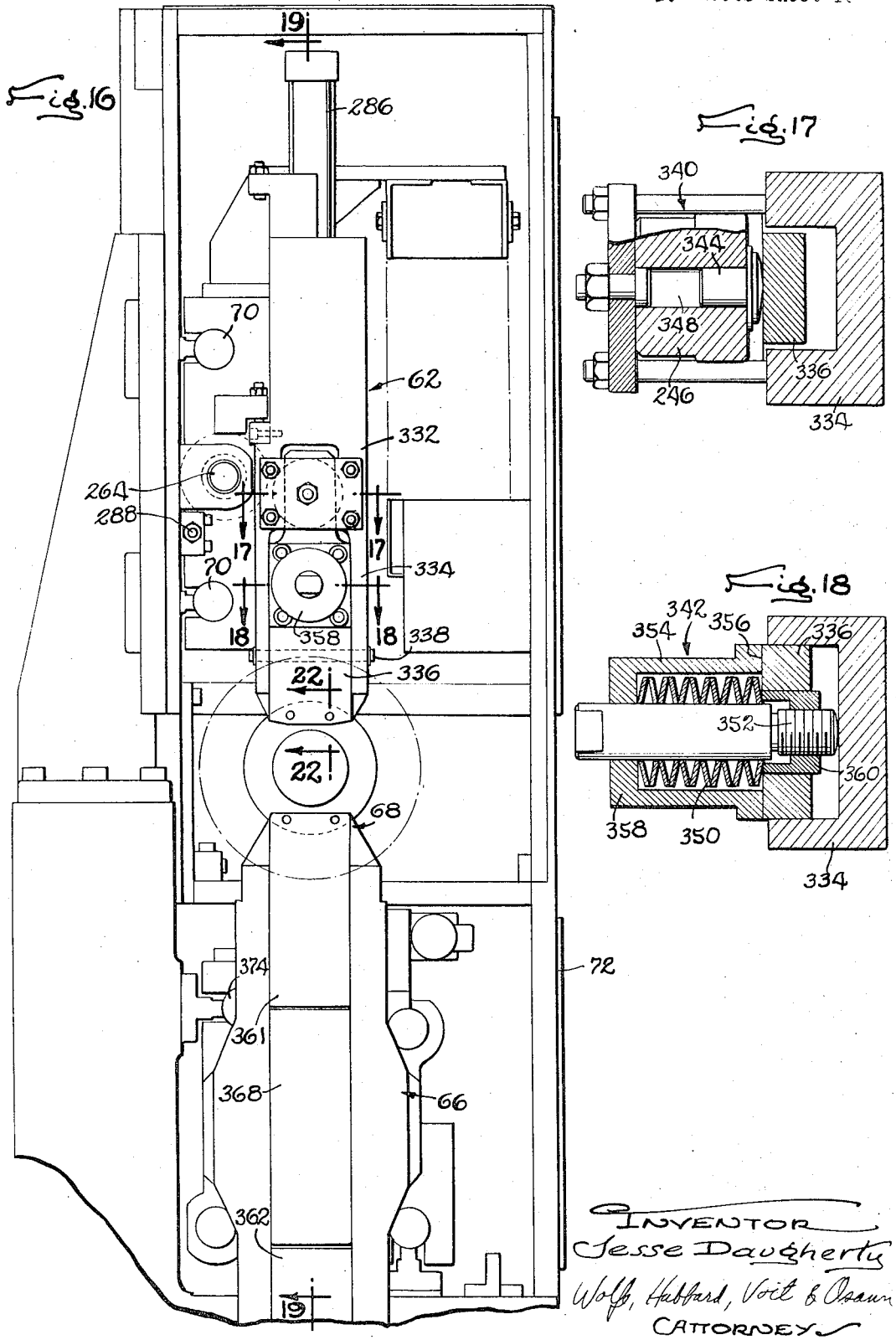

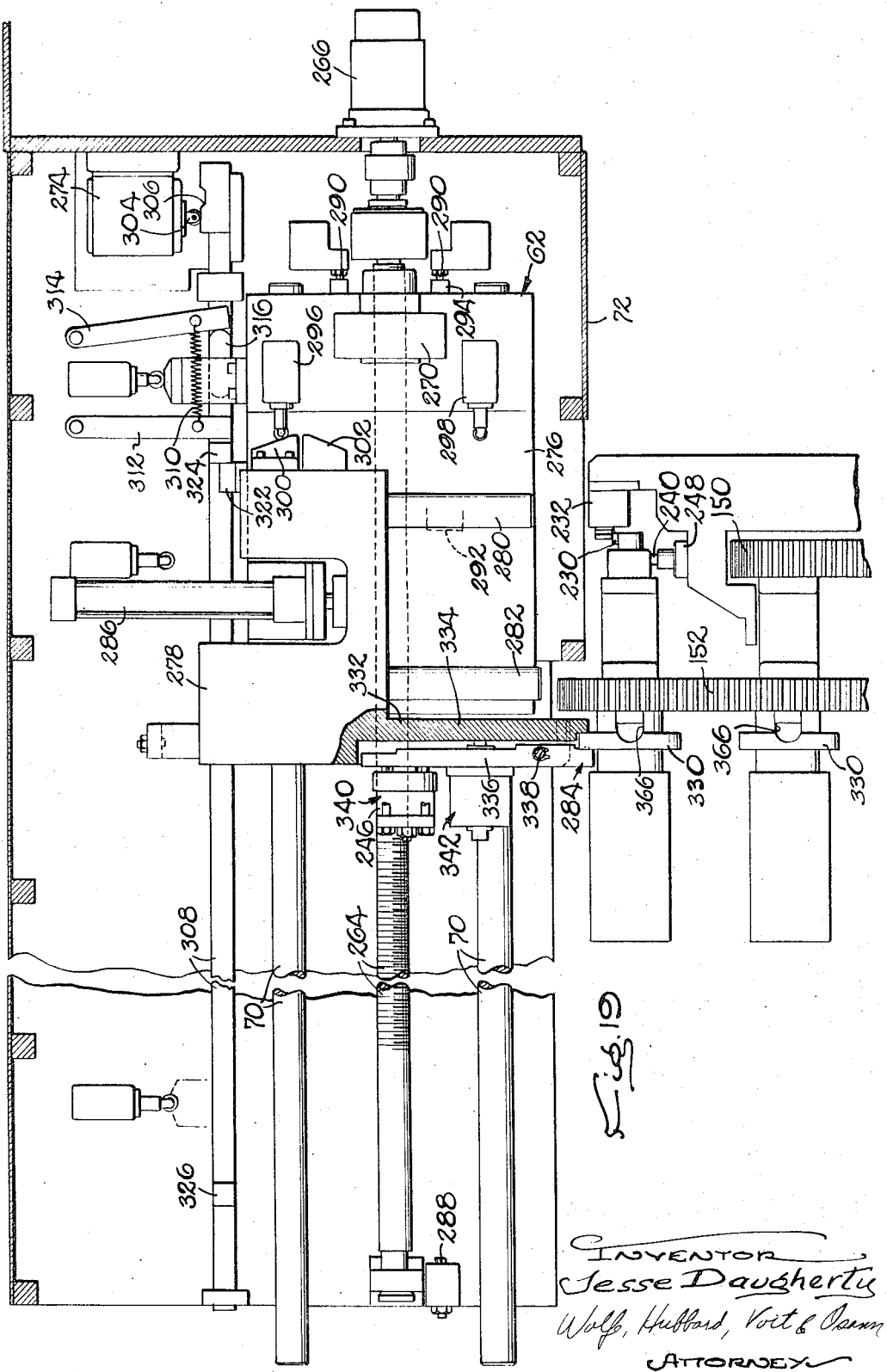

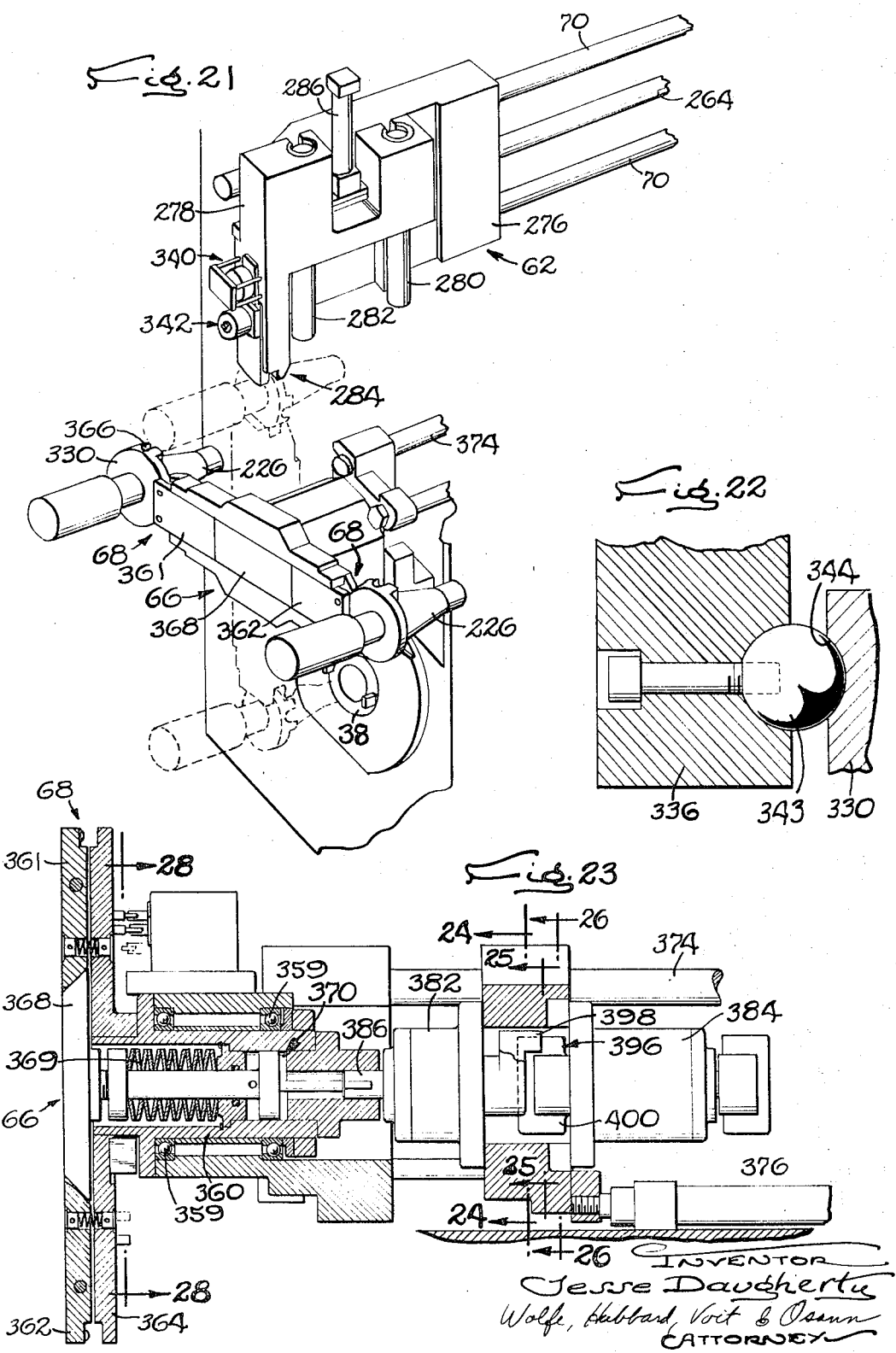

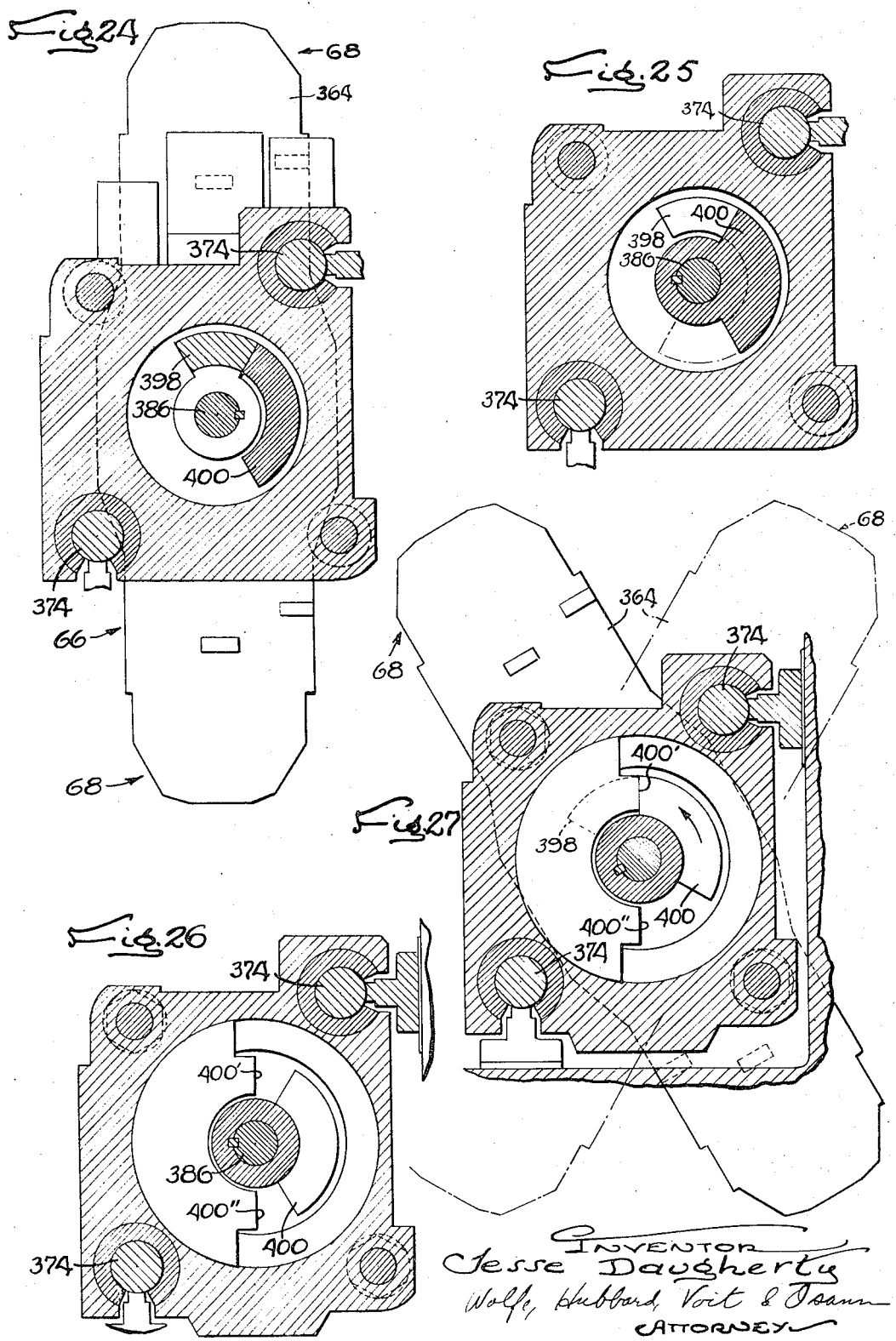

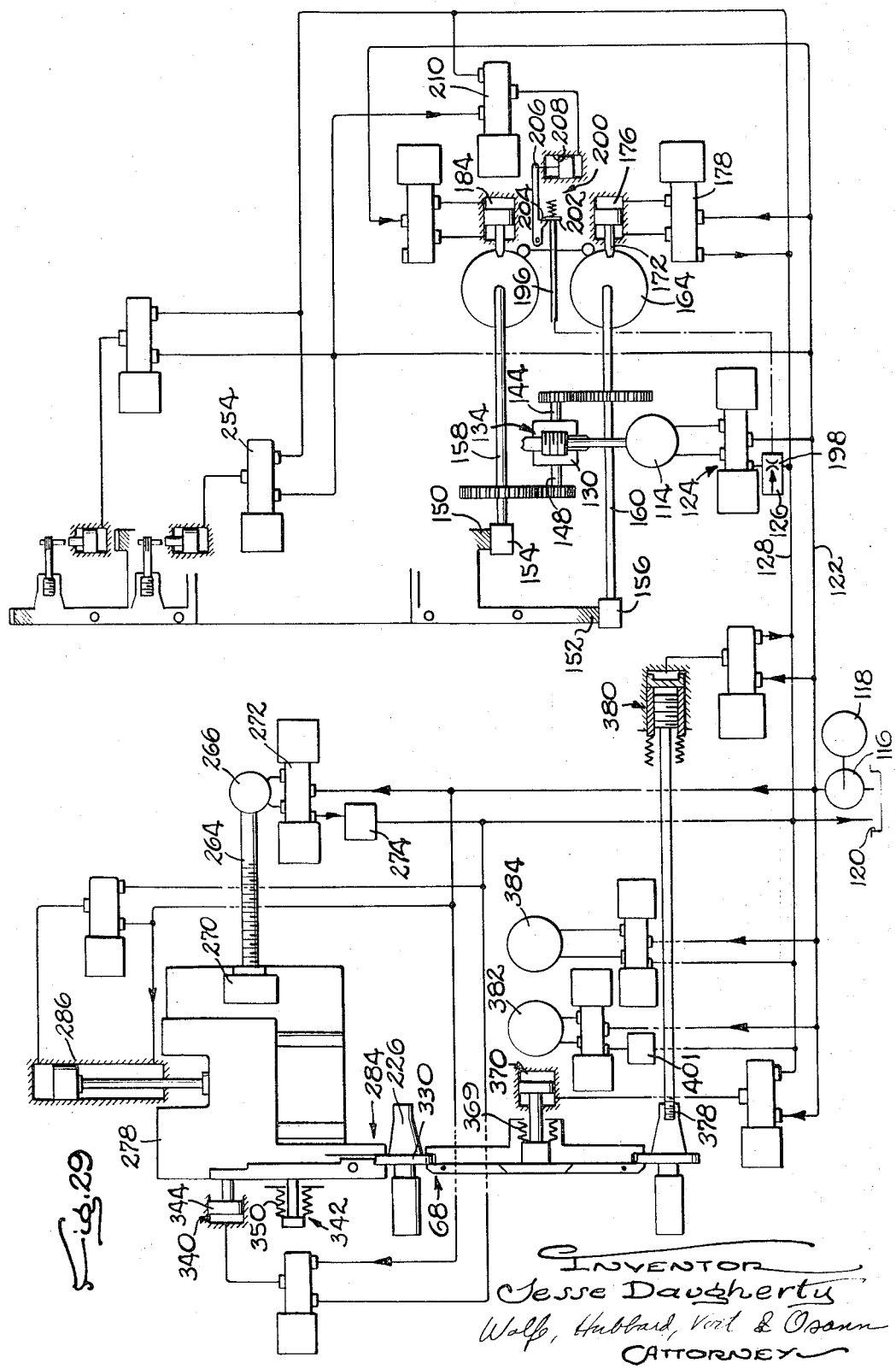

United States Patent Office 3,300,856
Patented Jan. 31, 1967

3,300,856
MACHINE TOOL WITH AUTOMATIC TOOL CHANGING APPARATUS
Jesse Daugherty, Fond du Lac, Wis., assignor to Giddings & Lewis Machine Tool Company, Fond du Lac, Wis., a corporation of Wisconsin
Filed Feb. 14, 1964, Ser. No. 344,931
23 Claims. (Cl. 29—568)

This invention relates to machine tools, apparatus for automatically changing tooling in machine tools, and machine tool components such as headstocks constructed particularly for use in machine tools equipped with automatic tool changing apparatus.

The principal object of the invention is to provide tool changing apparatus which is adapted particularly for use with machine tools operated by numerical control so that both machining and tool changing operations may be carried out completely automatically and a machining process may be programmed to operate without manual intervention from start to finish.

Another object is to provide tool changing apparatus which is capable of handling a wide variety of types and sizes of tooling so as to achieve a wider variety of different machining operations with a given machine tool completely automatically.

A related object in connection particularly with horizontal boring, drilling and milling machines, is to provide tool changing apparatus which is capable of handling different tools for such machines, including drills, long boring bars, milling cutters of different types, and larger mechanisms such as facing head attachments, so as to make it possible to program machining operations of widely diverse types on such machine tools, including the additional steps of automatically changing tooling between machining operations. In this way, machining operations on a workpiece conventionally carried out using several different machine tools may be carried out on a single horizontal boring, drilling and milling machine with tooling constructed for these operations, and the machine tool and the tool changing apparatus directed under numerical control according to a program of both machining and tool changing operations.

Another object of this invention is to increase or expand the tool storage capacity of a circular matrix for storage of tools while retaining ease of access to the storage compartments of such matrix.

Another object is to provide a matrix suited particularly for horizontal boring, milling and drilling machines wherein the tools that are stored in the matrix are supported independently of the machine tool headstock so as to eliminate the forces of matrix positioning and tool weight from affecting the machining operations while providing tool storage which is effectively an integral part of the machine tool.

A further object is to provide speedy and sure transfer of tools of all weights and sizes into and out of the tool storage matrix, along with a speedier transfer cycle.

A further object is to provide control for the tool storage matrix by which the matrix is positioned automatically to locate a tool for transfer to the spindle.

A related object is to provide control for the tool storage matrix which employs either variable or fixed matrix position identification for locating the matrix to transfer a tool in a particular matrix position to the machine tool spindle.

A further object is to provide a tool storage matrix which while mounted independently of the headstock of the machine tool is positionable vertically in unison therewith so as to maintain the tools in storage in the same relative position for tool changing while the headstock changes vertical position for machining.

A further object is to provide horizontal boring, drilling and milling machines which are capable of producing straighter holes in boring operations, utilizing the principle of an axially fixed spindle and moving the saddle to position workpieces relative to boring cutters rotated by the spindle.

A related object is to provide a spindle for horizontal boring, milling and drilling machines which is incrementally positioned axially to extend to various positions, is clamped in its various positions of extension within the spindle sleeve so as to be more rigidly supported by the sleeve, and provides a more rigid support for the sleeve which will reduce deflections of the spindle clamped therein even at high spindle speeds so as to permit machining to closer tolerances with the machine tool.

A related object is to provide boring, drilling and milling machine tools which will afford means to bore holes to greater roundness and straightness and to mill so as to obtain greater accuracy.

For enhancing the storage capacity of matrices for tool changing apparatus, it is now proposed to provide a dual matrix in the form of concentric individual storage rings or drums. In this manner, twice the storage of machine tools will be provided within the same overall matrix diameter while retaining the advantage that each matrix ring may be smaller and lighter, being individually driven and hence easier to drive, and quicker to move and stop in indexing than a single large matrix of the same capacity. A further object is to provide an improved matrix control to speed the tool location cycle.

A further object is to provide horizontal boring mills which can project a cutter into extended positions so as to be able to mill surfaces and bore deep holes which employs an axially fixed spindle during cutting operations. A further object is to provide an improved shuttle mechanism for an automatic tool changing apparatus by which tools are transferred from one end of the machine tool to the other as between a tool storage location and a spindle location.

A further object is to provide a shuttle mechanism which is carried directly by a machine tool headstock so that a tool carried in the shuttle is positioned immediately adjacent the spindle for transfer thereto.

Other objects and advantages will become apparent as the following description proceeds, taken in conjunction with the accompanying drawings, in which:

FIGURE 1 is a perspective view of a horizontal boring, milling and drilling machine tool with automatic tool changer constructed according to the present invention;

FIG. 2 is a perspective view of a typical tool used with the machine tool illustrated in FIG. 1;

FIG. 3 is a perspective rear view of the machine tool illustrated in FIG. 1 taken from the opposite side of the machine;

FIG. 4 is a fragmentary vertical rear elevation of the machine tool illustrated in FIG. 1;

FIG. 5 is a fragmentary vertical sectional view, diagrammatic, substantially in the plane of lines 5—5 in FIG. 4 and illustrating the main components of the machine tool; namely, the dual matrix for tool storage, the shuttle and its trackway for tool transfer, and the spindle;

FIG. 6 is a fragmentary horizontal sectional view of the machine tool;

FIG. 7 is a fragmentary vertical elevational view of a portion of the dual matrix as indicated by the plane of lines 7—7 in FIG. 8;

FIG. 8 is a fragmentary vertical sectional view through a portion of the dual matrix showing the mechanism for locking tools in the matrix;

FIG. 9 is an enlarged sectional view taken in the plane of lines 9—9 of FIG. 4 of the differential planetary drive for the dual matrix rings and associated control mechanism;

FIG. 10 is an enlarged detail view of the dual plate-cam assemblies and deceleration valve actuation means of the control mechanism also shown in FIGS. 4 and 9;

FIG. 11 is an enlarged fragmentary sectional view of the deceleration valve latch taken in the plane of lines 11—11 of FIG. 4;

FIG. 12 is an enlarged fragmentary sectional view taken in the plane of lines 12—12 in FIG. 8 showing a portion of the matrix breech lock drawbolt tool holder;

FIG. 13 is a fragmentary vertical section view taken in the plane of lines 13—13 in FIG. 8, through the shank of a tool and the breech lock drawbolt, showing the drawbolt threads in tool locking position;

FIG. 14 is a fragmentary vertical sectional view similar to FIG. 13 but showing the breech lock drawbolt threads in tool released position;

FIG. 15 is a fragmentary illustration of the coupling for operating the breech lock drawbolt mechanism in the matrix, taken in the plane of lines 15—15 in FIG. 7;

FIG. 16 is a fragmentary vertical front elevational view of the machine taken in the plane of lines 16—16 in FIG. 5;

FIG. 17 is a fragmentary horizontal sectional view through the shuttle taken in the plane of lines 17—17 in FIG. 16;

FIG. 18 is a fragmentary horizontal sectional view through the shuttle taken in the plane of lines 18—18 in FIG. 16;

FIG. 19 is a fragmentary vertical sectional view taken in the plane of lines 19—19 in FIG. 16;

FIG. 21 is a fragmentary perspective view of the rotary transfer arm in the act of transferring tools between the shuttle and a location adjacent the spindle;

FIG. 22 is a fragmentary sectional view taken in the plane of lines 22—22 in FIG. 16;

FIG. 23 is a fragmentary vertical sectional view illustrating the rotary transfer arm power actuating devices;

FIGS. 24–27 are vertical sectional views illustrating the rotary transfer arm rotary actuating mechanism in various stages of actuation, and are taken in the planes indicated for the respective views in FIG. 23;

FIG. 29 is a diagrammatic view illustrating the hydraulic system supplying power to various of the machine components.

Figure 20:
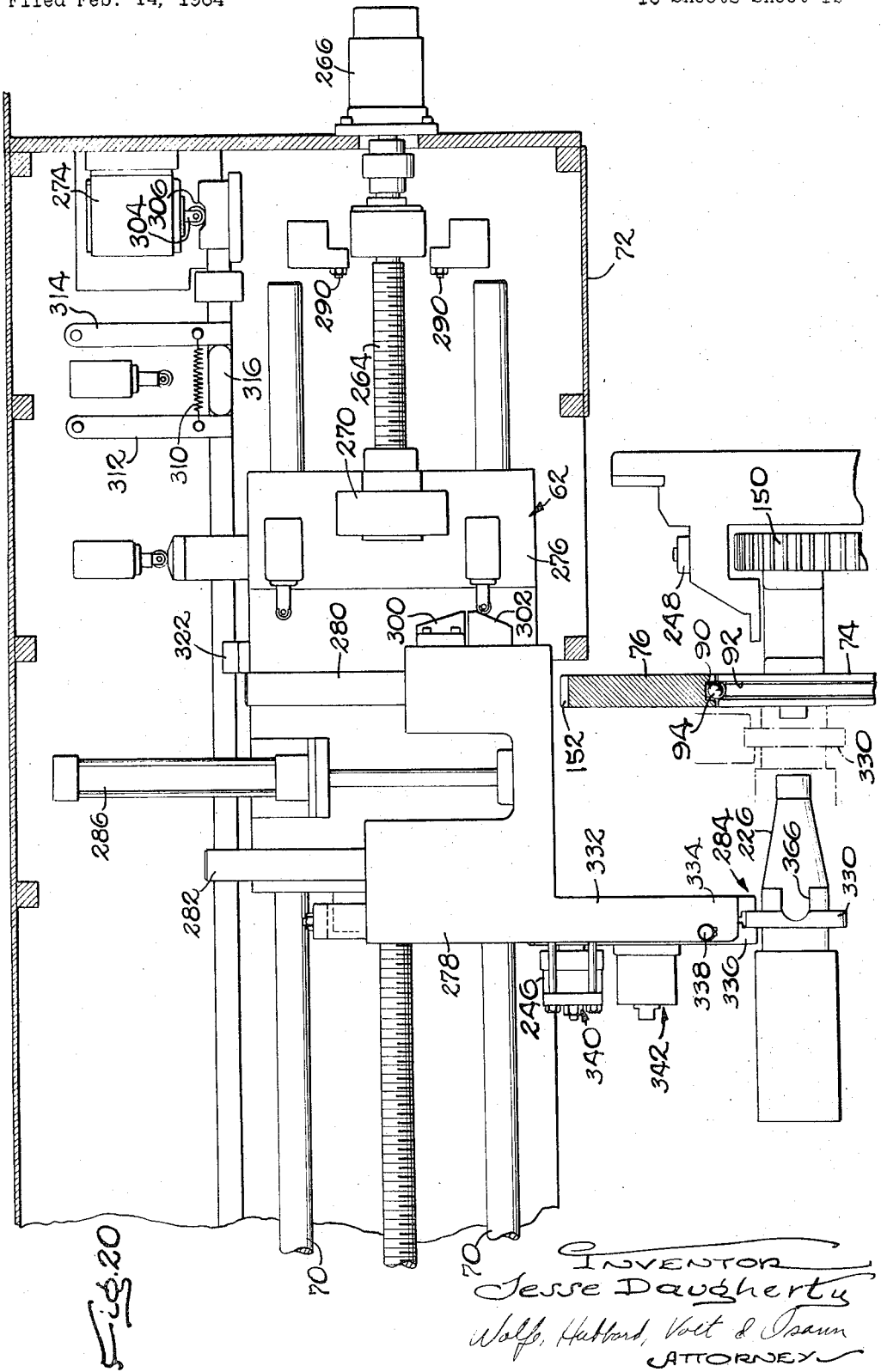
FIG. 20 is a view similar to FIG. 19 with the shuttle extended to grip a tool in the inner matrix ring and advanced along the shuttle trackway carrying a tool forward from the inner matrix.

While the invention is susceptible of various modifications and alternative forms, certain specific embodiments thereof are shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

GENERAL MACHINE ORGANIZATION

Upon specific reference to the drawings, it will be perceived that the invention is exemplified in an illustrative horizontal boring, milling and drilling machine 30. In general, such machine comprises a headstock 32 carried by an upright column 34 for vertical movement on vertical ways 36 on the side of the column 34. The headstock 32 supports a horizontal spindle bar 38 by means of a spindle sleeve 40 (FIG. 5), the spindle bar 38 being adapted to support a cutting tool for machining a workpiece. The workpiece is supported on a table 42 mounted for movement transverse to the spindle axis along ways 44 carried by means of a saddle 46. The saddle is in turn supported by ways 48 carried on a bed 50 for movement axially of the spindle. Thus, by appropriately controlled power driven movement of the table 42 and the saddle 46, a workpiece carried on the table may be positioned along either of two coordinate axes relative to a cutting tool rotated by the spindle bar 38.

The spindle bar 38 may be extended to various positions from the spindle sleeve 40 according to the type of machining operation to be performed on the workpiece and the configuration of the workpiece. Referring to FIG. 5, the spindle bar is clamped in the sleeve at any one of its various positions of extension to eliminate and lessen deflections, the bar being movable by a ram 52 carried rearwardly of the spindle by the headstock, the ram being operated by power such as a hydraulic piston and cylinder arrangement 54 to position the spindle.

The exemplary horizontal boring, drilling and milling machine illustrated in FIG. 1 also embodies apparatus for changing tools in the spindle automatically. For this purpose, a separate upright column 56 is carried adjacent the machine column 34 to support by means of vertical guideways 58 on the side face of the column 56 a tool storage matrix 60. A set of tools adapted to be received in the machine tool spindle may be stored in the matrix 60, the machine also incorporating apparatus carried by the headstock 32 for transferring tools between the tool storage matrix and the spindle automatically. In general, such tool changing apparatus comprises a horizontally movable shuttle 62 (FIG. 5) provided with tool gripping mechanism for gripping a tool in the matrix with the latter rotated to locate such tool at a shuttle station adjacent the rearward end of the shuttle path. Upon movement of the shuttle horizontally forward along the shuttle supporting trackway 64, the shuttle is effective to remove a tool from the matrix and transfer it along a horizontal path forward to a tool exchange position laterally adjacent the front end of the spindle in the headstock. The headstock 32 further carries a rotatable transfer arm 66 having radially extending elements each provided with a tool gripping mechanism 68. The tool change arm 66 provides a means for gripping a tool carried to the arm by the shuttle 62 from the storage matrix 60, and a tool received from the spindle, and upon rotation of the tool change arm operates to locate a tool received from the shuttle in position for receipt in the spindle, and transfers the tool received from the spindle to the shuttle for return to the storage matrix.

The tool storage matrix 60 while being supported by a separate column 56, is movable vertically on the side of said column in synchronism with vertical movement of the machine tool headstock 32 and tool changing apparatus carried thereby such that the position of the storage matrix remains substantially the same relative to such components regardless of the vertical position of the headstock. The horizontal shuttle 62 for transfer of tools between the matrix and the spindle is carried by a trackway 64, herein shown as formed by horizontal bars 70 supported in a horizontal box-like housing 72 which is carried by the headstock 32, such that the shuttle in its position at the rearward end of the horizontal path retains the same relative position with respect to the matrix regardless of the vertical position of the headstock.

The machine tool is adapted to be operated by automatic control means or by manual means. Thus, the machine tool is adapted to be operated by numerical control from a source of command signals derived, for example, from a magnetic or punched paper tape through a control system connected to operate the various power driven components of the machine. In this manner, the illustrative horizontal boring, drilling and milling machine equipped with tool changing apparatus is adapted to perform a series of machining operations with interspersed tool changing operations to change the tool in the spindle to adapt the same to carry out the various machining operations, and to perform both the machining and tool changing operations of a program completely automatically from start to finish.

One of the further features of the horizontal boring, drilling and milling machine disclosed herein is the provision of spindle bar 38 which may be extended to various fixed positions from the machine tool headstock for machining operations, with saddle feed to move the workpiece relative to a cutting tool rotated by the spindle bar. Heretofore, the practice with horizontal boring, drilling and milling machines has been to feed the spindle bar axially in order to perform boring operations on a workpiece carried by the machine tool table. It has been known that boring by feeding the saddle with a rotatable spindle fixed against axial movement produces a straighter hole and one with less taper. With spindle feed, the looseness of the bar in the spindle sleeve and the deflection of the bar due to tool cutting force and gravity changes the circle of rotation as the spindle bar feeds out, making the generation of a straight hole impossible to achieve in practice. The hole size must also taper as the spindle bar feeds out unless a double cutting tool is used.

In keeping with one of the important features of the horizontal boring, milling and drilling machine disclosed herein, boring with saddle feed produces a straighter hole as the sag and deflection of the spindle bar is constant. Moreover, by clamping the bar within the spindle sleeve, deflection of the bar is lessened, increasing machining accuracy. The present horizontal boring, drilling and milling machine provides power movement of the saddle and table, and hence boring by saddle feed rather than spindle feed is achievable with the present machine. Moreover, means are provided to extend the spindle bar to various positions to reach into pockets, bores and irregularities in workpieces, and to compensate for tool conditions.

TOOL STORAGE MATRIX

Turning now to the tool storage matrix 60 of the machine in greater detail, the structural aspects of the matrix will now be considered. In keeping with the present invention, the matrix is of a generally circular configuration, as shown in FIGS. 1 and 3, being provided with concentric annular rings 74, 76 (FIGS. 4, 8), each provided with a series of tool storage sockets 78. With this arrangement when the matrix is loaded with concentric circular arrays of tools adapted to be received in the machine spindle, any one of such tools may be removed from the matrix by the tool changing apparatus and transferred to the spindle.

The inner annular ring 74 of the matrix is supported, as shown in FIGS. 4 and 8, by an annular flange 80 on a tubular matrix sleeve 82. Matching grooves 84, 86 around the outside of the mounting flange 80 and the inside of the inner matrix ring 74 provide a race for balls 88, thus comprising an antifriction support for the inner matrix ring to facilitate rotating the same to present tools stored therein to the shuttle mechanism of the tool changing apparatus. The outer annular matrix ring 76 (FIG. 8) is in turn supported on the inner ring 74, matching grooves 90, 92 in the adjacent surfaces of these rings also providing a race for balls 94 to afford an antifriction support for the outer matrix ring. With this arrangement, the annular matrix rings 74, 76 are rotatable with respect to each other as well as with respect to the mounting sleeve 82, so that the rings may be independently rotated to present a tool in either ring to the shuttle mechanism for transfer to the machine spindle.

For the purpose of providing with a minimum of machining suitable races for the balls providing the antifriction supports for the outer and inner rings, hard metal wires 96 are laid in the corners of the grooves, as illustrated in FIG. 8. The balls thus ride on the metal wires. Referring to FIG. 3, the tubular mounting sleeve 82 supporting the annular matrix rings 74, 76 projects rearwardly of the matrix, only for slightly more than 180° so as to extend adjacent the side face of the matrix column 56. The flattened projecting sleeve portions 98, 99 are fixed to the outer face of a vertically transversable matrix saddle 102 which is supported by vertical guideways 58 fashioned on the side of the matrix column. The matrix saddle 102 is traversable vertically by an elevating screw 104 driven in synchronism with the elevating screw 106 for the headstock 32 by a cross shaft 108 as shown in FIG. 6, suitable counterbalances connected by counterbalance chains 110, 112 to the headstock 32 and matrix saddle 102 respectively being employed to relieve the elevating screws from a substantial portion of the weight of these members. Power for operating the headstock and matrix elevating screws 104, 106 may be provided by any suitable power source controlled from the overall control system for the machine.

Matrix planetary differential drive

In keeping with the present invention, hydraulic power is employed for positioning the matrix rings, a hydraulic motor 114 being provided for operating the rings under the direction and control of a system partially illustrated in FIG. 29. Pressure fluid is furnished to the hydraulic actuators of the machine, including the matrix drive motor 114, by means of a pump 116 driven by an electric motor 118, the pump discharging into a sump 120. The matrix drive motor 114 is connected with the pump output pressure line 122 by means of a solenoid operated four-way control valve 124, and means for controlling the matrix drive motor speed, herein shown as a metering valve 126, is connected in the low pressure line leading from the matrix drive motor to the return line 128 to the sump. For rotating the matrix rings 74, 76, this motor 114 drives into a planetary differential gear set 130 through a worm 131 and worm wheel 134. Referring also to FIG. 9, the planetary gear set comprises a planet carrier 132 located within and fixed to the worm wheel 134. Two sets of planet pinions 138, 140 are supported by the carrier. One planet set 138 is in mesh with a sun spur gear 142 carried by a shaft 144 which is connected by gearing to the outer matrix 76. The other planet set 140 is in mesh with a sun spur gear 146 carried by a shaft 148 which is connected by gearing to the inner matrix 74. The arrangement is such as to take advantage of the differential action caused when one of the sun gears 142, 146 is locked against rotation. When one of the sun gears is locked against rotation, it serves as a reaction member for the meshing planet gears to cause rotation of the free sun gear, the shaft and gears connected thereto, and thus one matrix ring 74 or 76.

As above noted, to transfer a tool to the machine spindle, the matrix is rotated to locate one of its sockets having the particular tool stored therein to a shuttle station adjacent the rearward end of the path of the tool transfer shuttle, for the tool to be extracted by the shuttle from the matrix and moved forwardly to a position laterally adjacent the front end of the spindle. The shuttle, by means described more fully below, is effective to grip a tool stored in either the inner or outer matrix ring and to extract that tool for transfer to the spindle. With the foregoing matrix drive arrangement including the planetary differential gearing 130, the matrix rings 74, 76 may be individually rotated under the direction of the control arrangement by the matrix drive motor 114. In this manner, a tool in either matrix ring may be moved around to a position at the rearward end of the shuttle path, i.e., to the shuttle station.

Deceleration and indexing control

One of the problems with large matrices and heavy tools, is how to control the matrix power unit so as to move the relatively cumbersome matrix structure rapidly while retaining the ability to stop the matrix quickly and precisely with a minimum of shock to the mechanism. In the present case, this problem is met with a unique deceleration control arrangement pictured in FIGS. 4, 7, 10 and 20. As shown in these figures, matrix rings 74, 76 are connected by ring gears 150, 152 respectively to pinions 154, 156 and drive shafts 158, 160 which are operated from the planetary gear transmission 130. As shown in FIGS. 9 and 10, these drive shafts 158, 160 each carry an index plate 162, 164 at the ends opposite the drive pinions 154, 156 and gear ratios are such that each drive shaft and the index plate carried thereby rotates one complete revolution while the respective matrix ring moves the angular distance between tool sockets in the matrix ring. Each index plate 162, 164 has an index pin locating slot 166, 168 on its periphery, which with an index pin 170, 172 seated in place, locks the associated matrix ring with one of its tool storage sockets at the shuttle station, so that a tool may be gripped by the shuttle and extracted for transfer to the spindle. The index pins 170, 172, moreover, serve to lock the reaction sun gears 142, 146 of the planetary transmission via the gearing and shaft arrangement so as to permit selective rotation of one of the matrix rings 74 or 76.

To this end, the index pin 172 associated with the index plate 164 for the outer matrix ring 76 is carried on a pivotable arm 174 power actuated by a hydraulic cylinder 176 between (1) its position with the index pin 172 seated against the index plate 164, and (2) a retracted position (shown in FIG. 10). Referring to FIG. 29, when the hydraulic cylinder 176 is supplied with pressure fluid under the control of a valve 178, the index pin 172 will be forced into the locating slot 168 in the associated index plate when the latter is rotated to bring the locating slot into alignment with the pin.

Since setting either pin with the associated matrix ring rotating rapidly would impose a heavy shock on the mechanism, in keeping with the present invention, means is provided for decelerating each matrix ring as it moves to bring a selected tool into the shuttle station, so that the index pin when shot home, stops the ring accurately without undue suddenness, the provison of deceleration control further permitting more rapid operation of the ring in the course of moving the tool storage sockets around towards their final position.

Moreover, the deceleration and indexing control, according to this invention, is usable with either dual matrices as illustrated in the drawings, or single matrices, as known in the art, so that the same control may be employed on a machine having matrices of either type. To this end, the deceleration and indexing control is mounted as shown in FIGS. 9 and 10 on the outside of a casing 179 for the planetary differential transmission supplying power to the matrix elements. The matrix ring drive shafts 158, 160 are mounted in side-by-side arrangement in the transmission casing, each projecting through a casing wall and being fitted at the projecting end with an assembly comprising a deceleration cam 180, 182 and an indexing plate 162, 164. The cam-plate assemblies for each matrix ring thus are located in side-by-side relation on the outside of the transmission casing, this also being shown in FIG. 4 and diagrammatically in FIG. 20. As appears in FIG. 10, for example, the index pins 170, 172 are pivotally mounted on one side of the index plates 162, 164 and are each retractible upon operation of their power cylinders 176, 184 to a position away from the respective plate. The lower index pin 172 is shown in FIG. 10 in its position away from the associated index plate 164, and upon movement to this position actuates a microswitch 186 to complete a circuit to the control valve 124 to permit start of the matrix drive motor, a similar microswitch 188 being provided in association with the upper index pin 170.

On the opposite side of the cam-plate assemblies, the right side as appears in FIG. 10, deceleration cam followers 190, 192 are mounted for actuation by the deceleration cams 180, 182 of the cam-plate assemblies. They are carried in this case by a common follower supporting arm 194 which is pivotally mounted intermediate its ends to a bar 196 used to transmit motion of either of the deceleration followers for control purposes. For this purpose, the left or control end of the bar is received in the deceleration valve 126 which has a variable flow metering valve orifice 198 (FIG. 29). The latter is connected effectively downstream of the matrix drive motor 114, as shown diagrammatically in FIG. 29. The arrangement is such that to decelerate a rotating matrix ring, the motor 114 is caused to operate as a pump under the momentum of the matrix. The deceleration valve orifice 198 is gradually restricted by movement of the bar 196 so as to cause build up of pressure in the output line 114" above the main pump pressure, and the motor 114 and matrix caused to decelerate by metering fluid flow through the output line 114" until the line is vertically blocked. Returning to FIG. 10, the other end of the bar 196 is supported for sliding movement in a fixed housing 199 and this end of the bar cooperates with a latching device 200 (FIG. 11) so that the bar may be selectively latched in a limit position with an operative cam follower 190 or 192 raised to the high point of the surface on the associated deceleration cam, and with the deceleration valve metering orifice open due to the bar being in its limit position relative to this valve. Referring to FIG. 11, a relatively simple latching device 200 is used, comprising a shoulder 202 on the bar 196 adapted to be shifted beyond and then come to rest against a projection 204 from a latching arm 206 in the latching sequence. A hydraulic cylinder 208 supported on the housing 199 and having its piston connected to the latching arm 206 is operable to raise the latching arm out of engagement with the bar to unlatch it. Referring to FIG. 10, the bar is adapted to be latched by the latching mechanism in ts right limit position, upon the bar being lifted to this position upon rotation of one of the deceleration cams and movement of the contacting follower roller radially outwardly to the high point on this cam. With the follower latched in the limit position, as shown in FIG. 10, the matrix drive motor will operate to rotate one matrix ring at a high rate the distance between adjacent tool sockets. How the index and deceleration control arrangement is employed to slow down and stop the matrix will be described in connection with a typical operating sequence of the matrix.

Assuming a starting condition (FIG. 4) with both index pins 170, 172 seated and with both matrix rings 74, 76 thereby locked against rotation, after a command to rotate the outer matrix 76 for example, one power cylinder 176 is actuated to retract the index pin 172 for the outer matrix ring 76 as shown in FIG. 10. With the solenoid control valve 124 for the matrix drive motor 114 energized to secure rotation of the latter, after the index pin cylinder 176 has retracted its index pin 172 and also causes actuation of the interlock microswitch 186, the outer matrix ring 76 will be driven through the differential planetary gearing 130, causing the deceleration cam 182 to be operated (as also shown in FIG. 10) to lift its follower roller 192 to the high portion of the cam surface. The bar 196 carrying the follower is then latched by the deceleration valve latch 200 to hold the follower from falling in as the cam surface drops on the deceleration cam upon further rotation thereof. At the same time, the motion of the bar 196 away from the deceleration valve 126 opens its orifice 198 so that the hydraulic matrix drive motor 114 operates at its fast speed to rotate the outer matrix ring 76. The ring will be rotated to move the tool sockets 78 past the shuttle station.

In keeping with this aspect of the invention, deceleration of the outer matrix ring 76 is initiated when the ring reaches an angular position approximately one socket away from the shuttle station. In general, this is achieved by suitable control means registering coincidence between a command signal designating matrix position and a signal produced by read out mechanisms associated with the matrix representing the particular position designated. It is contemplated that various systems may be used as desired. For example, a system has been employed of fixed position selection using cam stacks 212 mounted on the matrix one in association with each socket, such that each succeeding matrix socket in a ring is identified by a cam stack set up to represent a different binary coded number. Magnetic read out heads 213 produce signals representing the coded numbers as the cam stacks pass the read out heads. In the operation of the machine, a particular matrix socket number is programmed to cause the matrix to rotate to a position where the corresponding socket is located for transfer of a tool therein by the tool shuttle.

Another system might be employed where the cam stacks are constructed to be set up to represent different coded numbers, such a system thus employing variable position selection. Actual selection of the matrix ring may readily be accomplished by position number. The outer ring numbers, for example, may be from 1 to 32 and the inner ring numbers from 33 to 64. The matrix drive motor 114 is controlled by a four way, double solenoid, self-centering valve 124. Shifting of the valve spool in one direction with simultaneous withdrawal of the selected lock pin 170 or 172 causes rotation of the motor to drive the matrix in the proper direction.

For the present, it is sufficient to note the signal signifying the start of the deceleration period for the outer matrix ring is derived in the control circuit when the matrix ring reaches a point where the designated socket is the angular distance between adjacent sockets away from the shuttle station, and this signal is employed to decelerate the matrix in its rotation. As noted above, the cam-plate assembly carried on the end of the outer matrix ring drive shaft 160 rotates one revolution while the outer matrix ring 76 rotates the angular distance between tool sockets. Accordingly, the signal from the control circuit signifying the start of the deceleration period is employed to release the deceleration valve latch 200 by means of energizing a control valve 210 therefor to admit pressure fluid to the unlatch cylinder 208. The unlatch cylinder will thereby lift the latch arm 206 so that the bar 196 is free to move under the actuation of the springs 214 and thus the cam follower roller 192 is allowed to remain in contact with the cam 182 as it rotates rather than being held away from following the sloping cam surface. It will be furthermore seen from FIG. 10 that the height of the cam surface gradually drops to the low point of the cam. The surface is arranged so that the bar 196 connected to the follower gradually shifts and thereby actuates the deceleration valve 126 in a direction tending to restrict the metering orifice 198 of said valve, so that the orifice 198 virtually blocks flow when the follower reaches the low point on the cam. Thus the valve meters flow in the matrix drive motor circuit; the drive motor 114 now functions as a pump and causes deceleration of the motor 114 and the outer matrix ring 76 within the distance between adjacent sockets. Finally, the index pin 172 by completion of a circuit through limt switches 186, 188 and valve 178 is moved into engagement with the index plate 164 for the outer matrix ring 76, so that the pin will be shot into the locating slot 168 to accurately stop the ring with a particular tool socket at the shuttle station. One prime objective achieved with this arrangement wherein the matrix is decelerated in the distance between adjacent sockets, is the ability to move the immediately adjacent tool socket to the shuttle station for transferring a tool therefrom. Without means to decelerate the matrix in this limited distance, the matrix must be rotated through a complete revolution between successive tool transfer positions, to move the immediately adjacent tool socket to the shuttle.

Operation of the other inner matrix ring 74 is essentially the same. A sequence will begin assuming the starting condition depicted in FIG. 4 with the cylinder 184 retracting the index pin 170 for the inner matrix ring index plate 162 leaving the other index pin 172 engaged thereby locking the sun gear 142 connected to the outer matrix ring 76 against rotation so it serves as a reaction member for the planetary differential drive 130. The motor 114 will thus drive the inner ring 74 until a coincidence signal marks the start of the deceleration period, desirably with the designated tool socket one position away from the shuttle station. This signal conveyed to the latch cylinder solenoid valve 210 will cause the latter to operate the cylinder 208 to lift the latch arm 206 and thus release the follower bar 196. With the follower 190 allowed to fall onto the cam 180 and actuate the follower bar to gradually close the deceleration valve orifice 198, the motor 114 will be throttled to decelerate the inner matrix, and with the power cylinder 184 actuated to move the index pin 170 into locking position, the inner matrix ring 74 will be caused to stop, as the pin enters its locating slot 166, with the matrix socket accurately located at the shuttle station.

*Matrix tool latch*

To hold tools in the storage sockets in the matrix rings, while providing means for releasing the tools to the tool transfer shuttle, the present invention provides a power actuated latching mechanism. In carrying out this aspect of the invention, each matrix socket 78 is provided with a stub drawbolt 220 (FIG. 8) having a quadrifid threaded portion 222 (FIGS. 13, 14) adapted to be received in a similarly threaded socket 224 in a tool holder 226. As appears in FIG. 8, the stub drawbolt 220 projects into the associated matrix socket 78 and is movable axially as well as being rotatable therein.

At the rearward end, the stub drawbolt is fixed to a toothed clutch sleeve 228 having a lever arm 230 for operating an interlock switch 232 in its raised tool unlatched position as shown in FIG. 7. A disc 234 on the drawbolt 220 provides a surface for spring biased plungers 235 tending to urge the drawbolt axially forward to a relaxed position. In the latched position of the drawbolt 220, it is both retracted and rotated. A drawbolt 220 in such latched position is shown in FIG. 8 in the outer matrix ring 76, the clutch teeth on the clutch sleeve 228 ride on the top of fixed teeth 238 with the drawbolt in latched position, as shown in FIG. 15 to hold the drawbolt retracted and thereby hold a tool in the matrix socket. The drawbolt 220 is rotated to misalign the teeth 236, 238 as shown in FIG. 15 by spring biased plungers formed as opposed racks 240, 242 meshing with an intermediate pinion 244 fastened on the drawbolt 220. The drawbolt is retracted by pressure of an incoming tool carried into the socket by the shuttle. The end of the tool engages the disc 234 on the drawbolt and retracts the latter, allowing the spring biased plungers to rotate the bolt to engage its threads with the threads in the socket of the tool holder. In the locked position of the drawbolt, the threaded drawbolt segments will be rotated to engage the threaded segments in the tool holder as seen in FIG. 13.

Rotation of the drawbolt stubs from the latched position of FIGS. 13 and 15 to the unlatched position of FIGS. 12 and 14, is accomplished in the present case by external hydraulic actuators 246, 248, one such actuator 246 being associated with the inner matrix ring and the other actuator 248 being associated with the outer matrix ring. The hydraulic actuators 246, 248 are on the matrix saddle 102 carried by brackets 250, 252. As seen in FIG. 29, the power actuator 246 for the inner matrix ring is actuated upon operation of the associated solenoid valve 254 such that its piston engages to lift the plunger 240 of the latch mechanism, thereby rotating the drawbolt 220 to an unlatched position as shown in FIG. 14. With the drawbolt in the unlatched position, a tool in the matrix socket is free to be removed by the shuttle of the tool transfer apparatus.

TOOL TRANSFER APPARATUS

The tool transfer apparatus includes the shuttle 62 for transferring tools forward from or to the matrix 60 at the rearward part of the machine, and the exchange arm 66 at the forward part of the machine for transferring tools between a spindle location and the shuttle. These elements of the apparatus are assembled upon the machine headstock 32. In keeping with an important aspect of the invention, as appears in FIGS. 1 and 5, the axis of the spindle is parallel with the axis of the matrix, and the matrix is received with the rearward part of the headstock including the spindle ram 52 projecting into the open end of the matrix. Thus the tools as they are carried upon rotation of either matrix ring over the top of the matrix, are brought into the shuttle station for pick up by the shuttle. In the present case, the shuttle station is along the vertical axis of the spindle and shuttle as appears in FIG. 4. As also appears in FIGS. 3, 19 and 20, the shuttle is carried in a hollow box-like housing 72 which projects to the rear of the machine in overhanging relation with the matrix. It thus affords support for the shuttle to the limit of its rearward travel as well as supporting and enclosing a multiplicity of control elements and interlocks (FIG. 19) which are part of the operating and control circuits of the machine.

Shuttle support and drive

Considering more particularly the construction of the shuttle and its drive mechanism, referring to FIG. 21 it will be seen that the shuttle 62 is supported for movement on vertically aligned horizontal bars 70, which are carried on one side wall of the shuttle housing 72. To translate the shuttle along the bars, a drive mechanism is provided herein shown as a rotatable power screw 264 operated by a hydraulic drive motor 266 mounted to the rear wall 268 of the shuttle housing and connected by a fixed nut 270 to the shuttle. Rotation of the power screw 264 in one direction as desired, translates the shuttle forward from or back to the matrix. FIG. 29 illustrates the control circuit for the shuttle drive motor 266 including a solenoid control valve 272 for rotating the motor in the desired direction and for controlling the speed of translation of the shuttle. In addition to the solenoid control valve 272, the control circuit includes a deceleration valve 274 connected in the return line leading to the sump 120. The deceleration valve 274 decelerates the hydraulic drive motor 266 as the shuttle reaches the ends of its stroke in either direction of travel. Referring to FIGS. 5, 19 and 20, the shuttle 62 includes a horizontal slide 276 mounted in sliding arrangement on the horizontal bars 70 forming the shuttle trackway. The shuttle also includes a vertical slide 278 slidably supported on vertical bars 280, 282 carried by the horizontal slide 276. The vertical slide 278 is vertically traversable to either of two vertical positions for locating gripping means 284 carried by the vertical slide 278 for gripping a tool mounted in either the outer or inner matrix ring. The vertical slide is moved between its two positions by means of a hydraulic cylinder 286.

The position of the shuttle at the extreme limits of its horizontal stroke is determined by positive stops 288, 290 rigid with the headstock, which stops are engaged by abutment surfaces 292, 294 on the horizontal slide 276. Limit switches carried inside the shuttle housing 72 are actuated with the shuttle at its extreme limit positions providing position designating electrical interlock elements connected in the control circuit to provide for sequential operation of the slides and associated mechanisms. Vertical movement of the vertical slide 278 also produces actuation of limit switches, herein shown as limit switches 296, 298 carried by the horizontal slide and engaged by abutments 300, 302 mounted on the vertical slide.

In addition to the interlock means before referred to, the shuttle 62 in the course of its reaching the extreme limits of its horizontal stroke is effective to operate the deceleration valve 274 which is incorporated in the hydraulic circuit to the shuttle drive motor 266. To this end, the deceleration valve 274 is mounted in the shuttle casing 72 so that its operating plunger 304 projects downwardly for engagement by a cam 306. The cam 306 is actuated by a mechanical linkage to operate the deceleration valve 274 as the shuttle nears each end of its stroke. This linkage includes a horizontal bar 308 supported for limited longitudinal motion on the side wall of the shuttle housing 72. The bar 308 provides means for support of the deceleration valve actuating cam 306 and is biased to neutral position, as shown in FIG. 20, by spring means 310 connected between pivotally mounted levers 312, 314 in operative engagement with the bar 308. A projection 316 on the bar 308 is interposed between the outer ends of the levers 312, 314. In the neutral position of the assembly, as shown in FIG. 20, the spring means 310 between the levers 312, 314 biases the latter against stop pins 318, 320 fixed to the shuttle housing 72. With the levers 312, 314 held in the neutral position, as shown in FIG. 20, the bar 308 is likewise located in its neutral position by engagement of the ends of the levers with the projection 316 on the bars.

The operation of the linkage assembly to actuate the deceleration valve 274 as the shuttle nears the end of its return stroke toward the matrix, is shown in FIG. 19. The horizontal slide 276 of the shuttle carries an abutment 322 which engages an abutment 324 on the bar 308, causing the bar to move horizontally in the same direction as the shuttle against the return force of the spring means 310. As shown in FIG. 19, the bar is caused to move to the right, shifting the position of the valve actuator 306 and thereby lifting the deceleration valve operating plunger 304. The deceleration valve 274 for the shuttle drive is constructed like the deceleration valve 126 for the matrix drive and operates in a similar manner. Thus, the valve plunger 304 is effective when lifted to gradually restrict a metering orifice 305 in the motor circuit. The motor 266 is caused to act like a pump under the driving momentum of the shuttle, the restricted orifice 305 of the deceleration valve being gradually restricted to a point where flow is vertically blocked so that the shuttle is decelerated before hitting limit stops.

The operation of the deceleration valve 274 to slow down the hydraulic motor 266 and thereby slow down the movement of the shuttle 62 as it nears the end of its forward stroke, is similar to that described in connection with FIG. 19. Referring to FIG. 5, it will be seen that the abutment 322 on the shuttle slide engages a stop 326 on the bar 308, causing the latter to move to the left, and the actuator 206 to operate the deceleration valve 274, thereby causing the hydraulic drive motor to slow down before the shuttle reaches the end of its forward stroke and moves into engagement with its limit stops.

Shuttle for dual matrix

Having in mind the arrangement in the dual matrix of concentric rings for support of concentric circular arrangement of tools, consideration may now be given to the shuttle construction which permits removal of tools from either ring of the matrix. The vertically movable shuttle slide 278 is provided for movement radially inwardly of the matrix to position gripping means 284 carried by the slide on the flange 330 of a tool carried in the inner matrix ring and located at the shuttle station. By mounting the vertically movable slide 278 in this manner, the gripping means 284 carried by the slide is movable into gripping engagement with the flange on a tool holder located in either the inner or the outer matrix ring. Thus, the body of the slide 278 in the forward end supports an elongated suspended gripping arm 332 which reaches down toward the matrix 60. The arm is formed by a rigid channel member 334 having a movable plate 336 supported by a hinge mounting 338 in the channel opening side of the arm. The hinged plate 336 cooperates with the fixed channel member 334 to hold the flange of a tool holder therebetween, and the gripping assembly is actuated between spread released position and closed clamping position by separate power actuators 340, 342 carried by the vertical slide. In the present case, as shown in FIGS. 17 and 18, hydraulic means 340 is provided for spreading the clamping elements, and spring means 342 is provided for clamping such elements.

In the present case, for improved clamping action, both faces of the flange 330 of the tool are radial. The hinged member 336 of the grip carries two balls 343 (FIG. 22) inserted into the hinged member and these balls seat in an annular groove 344 formed in the flange face. The ball seat provides counteracting surfaces to prevent movement of the tool in the grip by centrifugal force and also rotating the tool in the grip caused by accelerating and decelerating of the arm.

Due to the high gripping force attainable with heavy springs 350 and a high lever ratio, and the small movement characteristic of the tool grip, it is mandatory that the tool flange 330 be accurately made and that the relation of tool flange to taper gage line be accurately held. As held in the matrix the tool flanges rotate through the shuttle hand gripping fingers as the matrix rotates to position tools to the shuttle station. Clearance on the movable member side of the tool flange is preferably about 1/16" provided by hinged motion. However, about one-half this clearance is lost in deflection of the fixed member under release of the spring force. Among the features of this tool handling construction is that the total assembly is strong and rigid to handle heavy out of balance tools. The number of parts is small, loose sliding joints are eliminated, and the parts are simple to make.

Referring to FIGS. 17 and 29, the hydraulic means for spreading the clamping elements or fingers includes a plunger 345 slidable in a bore provided in a body member 346 bolted to the fixed channel member 334 of the clamping assembly. The plunger 345 of the actuator engages the outer surface of the hinged member 336 of the assembly at a substantial distance from the hinge mounting such that upon admission of pressure fluid to the hydraulic chamber 348 behind the plunger, the latter is caused to pivot the hinged member, opening the gripping jaw at the other end of the latter to unclamp the flange of a tool held therein, or to spread the gripping elements to receive a tool flange. Now referring to FIG. 18, a stacked assembly of Belleville type disc springs 350 is employed through a high lever ratio to provide a heavy spring force, tending to clamp the gripping elements of the assembly. For this purpose, a threaded bolt 352 reaching through the hinged member 336 of the assembly and engaging the bottom surface of the fixed channel member 334 thereof provides a means for adjusting the compression force of the spring assembly. The stacked assembly of the disc springs 350 is received in annular cavity formed by a hollow casing 354 fastened at its upper end 356 to the hinged member 336 of the gripping assembly. One end of the bolt 352 is unthreaded and slidably projects through the outer wall 358 of the spring casing 354. The bolt is threaded into a threaded sleeve 360 which being slidable in the hinged member 336 forms a seat for the springs 350 which bear against the outer wall 358 of the spring casing. The springs tend to urge the casing 354 and attached hinged member 336 away from the fixed channel arm 334, thus moving the gripping jaws at the end of the arm toward gripping engagement.

As shown in FIG. 20, because of the deep recess in the bottom of the vertical slide 278, the long arm suspended below the slide is adapted to reach upon downward movement thereof a location opposite the inner matrix ring 74. Thus the end of the arm is located to grip the flange 330 of a tool holder positioned in the inner matrix ring as shown in dash-dotted lines in FIG. 20. To remove a tool from the inner matrix ring after the tool has been unlatched by appropriate operation of the unlatching mechanism shown in FIGS. 12–14, the shuttle 62 is caused to translate horizontally forward along its trackway to the position shown in solid lines in FIG. 20. At this point in the operation, the vertical slide 278 is raised and the shuttle is translated forward to its stop position adjacent the spindle of the machine.

In order to reach to the inner matrix ring without interference by tools supported in the matrix, the preferred arrangement herein contemplated is to leave one tool socket 78 in the outer matrix ring 76 open (without a tool) to provide clearance for the vertical slide and a tool held thereby. A tool removed from the inner ring may be moved radially of the matrix by operating the power cylinder 286 to raise the vertical slide 278 to a position substantially aligned with the circle of tool sockets in the outer matrix ring 76. A tool carried by the shuttle 62 with the vertical slide 278 in the raised position is suspended below the shuttle for transfer to the rotary exchange arm 66 at the front of the machine. Thus, as shown in FIG. 5, the rotary exchange arm provides means for receiving a tool held by the shuttle and for rotating the same to a position in alignment with the spindle, while at the same time providing means for rotating a tool taken from the spindle and positioning the same for transfer to the shuttle.

*Tool exchange arm*

Provision is made for rotatably supporting the tool exchange arm to swing tools held by the arm between the extreme positions shown in FIG. 23, herein shown as bearings 359 with a body 360 carrying the arm 66 being journalled in the bearings. In general, the tools are held by gripping assemblies or hands including hinged members 361, 362 of the construction embodied in the shuttle, and a fixed channel member 364, the arrangement being such that relatively great gripping pressure can be applied to a small area on the flange 330 of a tool by the gripping hands whereby a tool will be held securely and against movement in either the shuttle or exchange arm.

Moreover, this construction for the gripping fingers facilitates "Hand off" (the placing of two gripping hands on the tool simultaneously). This simplifies the tool translating mechanism in that the shuttle 62 simply closes the grip on the selected tool, and carries it forward in a straight line to a position where the arm 66 rotates to straddle the tool flange 330. The arm hands grip both old and new tool, the shuttle hand releases, the spindle retracts and the arm rotates 180° to exchange the tools. It will furthermore be noted that because the tools are held rigidly and against movement in both the exchange arm and shuttle, the tools undergo a 180° change in angular position in the process of being transferred from the spindle to the arm, from the arm to the shuttle, and from the shuttle to the matrix—and are returned to precisely their original position during the reverse sequence from the matrix to the spindle. Thus tools will be presented to the spindle oriented so that the slots 366 in the tool flange are received on drive keys on the spindle, since the orientation of the tools when removed from the spindle will be retained throughout the course of return to the matrix and re-transfer to the spindle.

Now referring to FIG. 23 for further details of the operating mechanism for the exchange arm 66, the arm includes a spring operated actuator 369 simultaneously engaging the ends of both hinged members 361, 362 to urge the same toward clamping engagement, and a hydraulic actuator 370 acting in opposition to the spring means 369 for releasing the clamping pressure. In addition to being mounted for rotary movement, the exchange arm 66 is also mounted for limited axial motion so as to be movable to and from a parked position against the front of the headstock 32. For this purpose, the body 360 is slidably supported by horizontal round bars 374 bolted in the headstock to form a support for the tool exchange arm body. Axial motion of the body and arm carried thereon is achieved by means of a hydraulic cylinder having a piston 376 fixed at its forward end to the body member.

While the exchange arm 66 is mounted for axial motion, the motion is not provided in this case for removing tools from the spindle or the shuttle. Instead, the tool exchange arm is translated forward before any tool changing operation to a position far enough ahead of the headstock to clear the same upon rotation of the arm with tools gripped therein. The operative position of the arm 66, illustrated in FIG. 21, is such that a tool will be placed in or removed from the gripping hand of the shuttle 62 with the latter at its forward position. Axial spindle motion is used to separate the spindle from engagement with a tool being transferred therefrom to the tool change arm. Referring to FIG. 5 for example, the tool change arm 66 is shown gripping the flange 330 of a tool holder still received in the spindle bar 38. To free the tool holder from the spindle bar, in keeping with this invention, the spindle bar 38 is retracted into the headstock 32 to the position of FIG. 21, for example, whereupon the exchange arm 66 is rotated to exchange tools between the shuttle and spindle locations. To seat a new tool in the spindle bar 38, the latter is moved axially forward until the shank 226 of the tool is fully seated in the spindle socket, whereupon a power drawbolt 378 in the spindle is actuated by its drive motor 380 to lock the tool in place.

Figure 28:
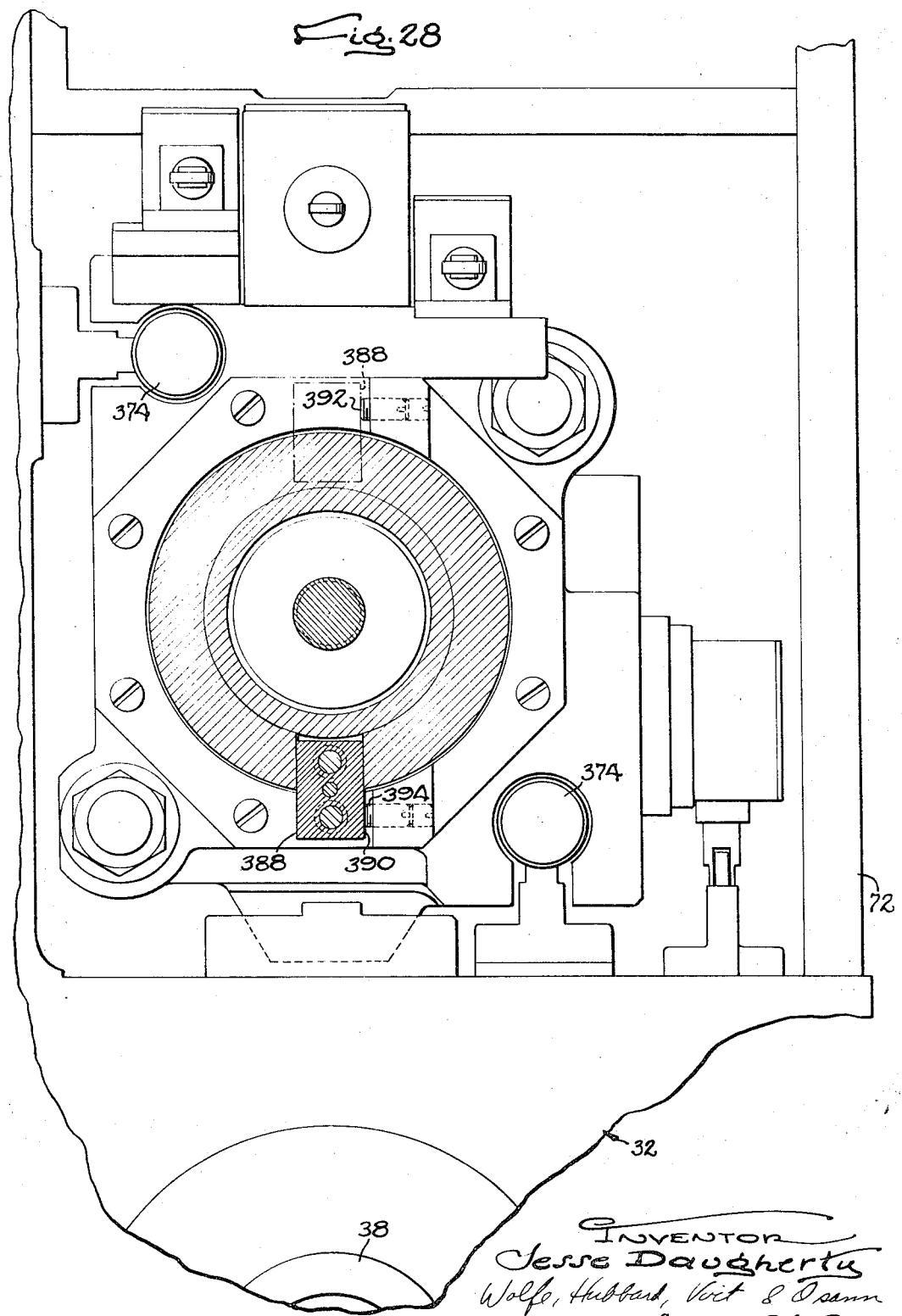
FIG. 28 is a fragmentary vertical sectional view through the rotary arm actuating devices taken in the plane of lines 28—28 in FIG. 23.

The requisite rotary motions of the tool exchange arm 66 are produced in an expedient and unique manner by two rotary hydraulic motors 382, 384 (FIG. 23) differentially connected to the rotatably mounted tool exchange arm body 360. How this is achieved will be seen by reference to FIGS. 23-27. The rotary hydraulic device 382 mounted toward the front of the mechanism is a single vane indexing unit which is directly connected to the rotatable tool exchange arm body 360 via a shaft 386 and provides 180° rotation of the tool exchange arm to transfer tools between the shuttle and the spindle. At the extreme limits of this 180° motion, abutment 390 (as shown in FIG. 28) on the tool exchange arm body 360 move, into engagement with stops 392, 394 supported by the headstock. These stops assure accurate positioning of the arm to grip tools in either the shuttle or spindle.

The second rotary hydraulic device 384 mounted to the rear of the first device 382 is a double vane parking unit which provides twice the torque of the indexing motor 382. It rotates through an angle of 60° and is connected to the indexing rotary hydraulic device by a lost motion connection 396. The function of the parking rotary hydraulic device 384 is to overcome the torque of the indexing unit and thus rotate the shaft 386 of the indexing device 382 and thereby the tool arm through an angle of 30° in a direction opposite to that of the last tool interchange position. This is for the purpose of rotating the tool exchange arm to one of the park positions shown in FIG. 27. Referring to FIG. 24, with the tool exchange arm 66 arranged vertically in a particular tool interchange position, rotary movement of the indexing hydraulic device 382 counterclockwise as viewed in this figure for an angular motion of 180° will reverse the position of the arms for tool exchange purposes. A wedge-shaped cam 398 carried by the motor shaft 386 on the rear of the motor 283 forms part of the lost motion coupling and in the course of such motion will move to the dotted position shown in FIG. 25. Clockwise movement of the parking unit for 30° angular motion will shift the arm 66 to the park position shown in dotted lines in FIG. 27. The lost motion connection for this purpose includes a wedge-shaped cam 400 extending 120° and fixed to the shaft of the parking motor 384, being engageable with the cam 398 of the indexing motor 382 and fixed stops 400', 400" as shown in FIG. 27. The higher torque rotary parking motor 384 carrying the 120° cam 400 is effective to overcome the torque of the indexing motor 382, when it is actuated, to rotate the tool exchange arm to the park position shown in solid lines in FIG. 27 from the vertical position of FIG. 24. the particular park position being dependent on which interchange position the arm happens to be in. It will be noted that with the arrangement, motion of the arm is confined to 180° in one direction and then return, rather than continuing for a full revolution. The limits of the arm motion being determined by stops, parking (regardless of which interchange position the arm is in) is accomplished by shifting the arm 30° away from the limit stops.

Suitable means for controlling the speed of indexing the arm is preferably included, such as deceleration valves 401 engageable by means on the arm upon rotation, the deceleration valves 401 being included in the parking and indexing motor circuits as shown in FIG. 29.

Spindle positioning

One of the features of the machine mentioned before is that the spindle bar 38 is adapted to be clamped at various positions of extension from the headstock 32, and boring operations are adapted to be performed by saddle feed causing movement of the workpiece relative to a cutting tool rotated by the extended spindle bar. Boring with saddle feed produces a straighter hole as the sag and deflection of the bar is constant. Referring to FIG. 5, it will be seen that the spindle sleeve 40 is held against axial motion in the headstock 32 and is rotated by a ring gear 402 driven by a pinion 404 connected to the spindle drive motor 406. The spindle sleeve 40 is thus rotated in order to rotate the spindle bar 38, the bar being movable axially within the sleeve by means of a ram 52 at the rearward end of the headstock. A take up collet or spindle clamp (not shown) is employed to eliminate any looseness between the spindle bar and the sleeve, to reduce deflection of the bar and thereby obtain better accuracy in machining.

With the saddle 46 moved by power at variable feed rates under the direction of the control system, machining operations including boring operations may be performed with the spindle bar 38 fixed against axial motion. By providing means for extending the spindle bar 38 to different positions forward of the headstock 32, the cutting tool held in the spindle may be located to make deep bores in workpieces and to reach into irregular workpieces.

For this purpose, the spindle bar 38 is positionable by 2 inch increments under power over its full longitudinal travel and is adapted to be clamped at each position for machining. While various arrangements may be used to accurately locate the spindle at its various longitudinal positions, a gage rod assembly 408 has been employed as shown diagrammatically in FIG. 5. This gage rod assembly includes a drum 410 rotatably supported on the ram guide 412 above the ram 52 in longitudinal alignment therewith. The drum 410 is power indexed under the direction of the machine control system by means such as a stepping motor 414, suitable means being provided to maintain the drum in each of its indexed positions. In each of its indexed positions, one of a series of gage rods 416 supported in the drum is located for engagement by an abutment 418 which is secured to the ram 52 and which projects upwardly so as to be located in longitudinal alignment with a gage rod on the underside of the drum. In the present case, the drum carries nine gage rods which vary in length from 2 inches to 16 inches, in 2 inch increments. The nine rods plus the limit stop on the ram 52 provides ten positions of the spindle bar in 2 inch increments for a total longitudinal travel of the spindle bar 38 of 18 inches. The extended positions of the spindle bar will thus be determined by the length of the gage rod 416 which is located on the underside of the drum with the drum in a particular indexed position, the gage rod being held against a positive stop 420 on the ram guide on one end and being engaged by the abutment 418 on the ram at the other end. It will be seen by reference to FIG. 5 that hydraulic pressure applied to the left-hand end of the ram cylinder 54 will move the ram 52 and the spindle bar 38 to bring the abutment 418, rod 416, and stop 420 into end abutting relationship. Deceleration means may be provided for slowing down the longitudinal movement of the ram upon admission of pressure fluid to the ram cylinder so as to avoid shocks caused by high speed engagement of the abutment on the ram with one of the gage rods.

With this arrangement, the spindle bar 38 and thus the abutment 418 carried by the ram, is fully retracted when a new gage rod 416 is to be selected for repositioning the spindle to a new setting. Other arrangements for securing desired positions of extension of the spindle bar may be provided which avoid this limitation of the gage rod assembly. In the present case, however, one of the gage rod determined positions for the spindle bar is with the spindle bar 38 located projecting forwardly of the headstock 32 in the position of FIG. 5. This is the tool transfer position of the spindle bar where a tool held in the spindle bar is located for engagement by the gripping means on the ends of the tool exchange arm. By retracting the spindle bar 38 from the position in which it appears in FIG. 5, the end of the spindle may be removed from interference with the tool and the tool thus freed for exchange with a tool in the shuttle.

I claim as my invention:

1. In a machine tool, a headstock having a rotatable spindle adapted to rotate a tool for machining, an upright column carrying said headstock for vertical movement thereon, a tool change apparatus carried by said headstock for exchanging a tool in said spindle with a different tool, and tool storage means providing a plurality of tools each adapted to be exchanged with a tool in said spindle by said tool changing apparatus, said tool storage means including a movable matrix for supporting a plurality of tools, an upright column carrying said movable matrix for vertical movement thereon, interconnected power elevating means for said headstock and said matrix for raising or lowering the latter in unison so as to maintain the same relative position of tool change apparatus and matrix for all vertical positions of said headstock.

2. In a machine tool having a spindle and tool changing apparatus for changing a tool in said spindle with a new tool, a tool storage means including a movable matrix for supporting a plurality of tools, an upright column carrying said movable matrix, said matrix comprising separate concentric rings rotatably mounted with respect to each other, each of said rings having a plurality of tool receiving sockets, and power means for selectively rotating said rings to locate a tool in a socket thereof for transfer by said tool changing apparatus.

3. In a machine tool having a spindle and tool changing apparatus for changing a tool in said spindle with a new tool, a tool storage means including a movable matrix for supporting a plurality of tools, an upright column carrying said movable matrix, said matrix comprising separate concentric rings rotatably mounted with respect to each other, the outer ring being rotatably supported by the inner ring, said inner ring being rotatably supported by means on said column, each of said rings having a plurality of tool receiving sockets, and power means for selectively rotating said rings to locate a tool in a socket thereof for transfer by said tool changing apparatus.

4. In a machine tool having a spindle and tool changing apparatus for exchanging a tool in said spindle with a new tool, tool storage means presenting tools at different positions to said tool changing apparatus, said tool changing apparatus including a linearly movable shuttle for carrying a tool from a shuttle station adjacent one of said tool storage positions to a station adjacent said spindle, and means carried by said shuttle and movable angularly with respect to said linear path for reaching a second tool at another of said storage positions.

5. In a machine tool, a headstock having a horizontal rotatable spindle adapted to rotate a tool for machining, an upright column carrying said headstock for vertical movement thereon, a tool change apparatus carried by said headstock for exchanging a tool in said spindle with a different tool, said tool change apparatus including a horizontally movable shuttle power operated to move a tool from a position above said spindle rearward to a shuttle station adjacent the rearward end of said headstock, and tool storage means providing a plurality of tools each adapted to be exchanged with a tool in said spindle by said tool changing apparatus, said tool storage means including a movable matrix for supporting a plurality of tools and movable to position a selected one of said tools at said shuttle station, an upright column carrying said movable matrix for vertical movement thereon, and interconnected power elevating means for said headstock and said matrix for raising or lowering the latter in unison so as to maintain the same relative position of tool change apparatus and matrix for all vertical positions of said headstock.

6. In a machine tool having a spindle and tool changing apparatus for changing a tool in said spindle with a new tool, a tool storage means including a generally circular matrix mounted for rotation about a horizontal axis and adapted to support a plurality of tools, an upright column carrying said movable matrix, said matrix comprising separate concentric rings rotatably mounted with respect to each other.

7. In a machine tool having a spindle and tool changing apparatus for changing a tool in said spindle with a new tool, a tool storage means including a generally circular matrix mounted for rotation about a horizontal axis and adapted to support a plurality of tools, an upright column carrying said movable matrix, said matrix comprising separate concentric rings rotatably mounted with respect to each other, said tool changing apparatus including a linearly movable shuttle for carrying a tool from a shuttle station adjacent one of said matrix rings to a station adjacent said spindle, and means carried by said shuttle and movable radially with respect to said matrix for reaching a second tool in the other of said matrix rings.

8. In a machine tool having a spindle and tool changing apparatus for exchanging a tool in said spindle with a new tool, tool storage means presenting tools to said tool changing apparatus, said tool changing apparatus including a linearly movable shuttle for carrying a tool from a shuttle station adjacent said tool storage means to a station adjacent said spindle, drive means for said shuttle comprising a drive member connected to translate said shuttle, power means for operating said member to translate said shuttle in either direction between said stations, and control means for gradually decelerating said power means to slow down said shuttle gradually as said shuttle approaches either station.

9. In a machine tool having a spindle and tool changing apparatus for exchanging a tool in said spindle with a new tool, tool storage means presenting tools to said tool changing apparatus, said tool changing apparatus including a linearly movable shuttle for carrying a tool from a shuttle station adjacent said tool storage means to a station adjacent said spindle, drive means for said shuttle comprising a drive screw connected to translate said shuttle, power means for rotating said drive screw to translate said shuttle in either direction between said stations, and control means for gradually decelerating said power means responsive to said shuttle reaching a predetermined position ahead of either station to slow down said shuttle gradually as it approaches either station.

10. In a machine tool having a spindle and tool changing apparatus for exchanging a tool in said spindle with a new tool, tool storage means presenting tools to said tool changing apparatus, said tool changing apparatus including a linearly movable shuttle for carrying a tool from a shuttle station adjacent said tool storage means to a station adjacent said spindle, drive means for said shuttle comprising a drive screw connected to translate said shuttle, a reversible rotary hydraulic actuator for rotating said drive screw in either direction to translate said shuttle in either direction between said stations, and control valve means for variably metering hydraulic flow through said actuator and thereby gradually decelerating said actuator in either direction of rotation thereof responsive to said shuttle reaching a predetermined position ahead of either station to slow down said shuttle gradually as it approaches either station.

11. In a machine tool having a spindle and tool changing apparatus for exchanging a tool in said spindle with a new tool, tool storage means presenting tools to said tool changing apparatus, said tool changing apparatus including a linearly movable shuttle for carrying a tool from a shuttle station adjacent said tool storage means to a station adjacent said spindle, drive means for said shuttle comprising a drive member connected to translate said shuttle, means including a rotary hydraulic motor for operating said member to translate said shuttle between said stations, and control means operative to gradually decelerate said shuttle as said shuttle approaches either station by utilizing said rotary hydraulic motor as a pump to dissipate the momentum of said shuttle.

12. In a machine tool having a spindle and tool changing apparatus for exchanging a tool in said spindle with a new tool, tool storage means presenting tools to said tool changing apparatus, said tool changing apparatus including a linearly movable shuttle for carrying a tool from a shuttle station adjacent said tool storage means to a station adjacent said spindle, drive means for said shuttle comprising a drive screw connected to translate said shuttle, power means for rotating said drive screw to translate said shuttle in either direction between said stations, deceleration means for gradually decelerating said power means to slow down said shuttle gradually as its approaches either station, and means for operating said deceleration control means in response to motion of said shuttle including a pivotal lever resiliently biased against movement in either direction from a neutral position and mounted for movement away from said neutral position against said bias by said shuttle as the latter approaches one station or the other.

13. In a machine tool having a spindle and tool changing apparatus for exchanging a tool in said spindle with a new tool, tool storage means including concentric matrix rings presenting tools at vertically spaced positions respectively to said tool changing apparatus, said tool changing apparatus including a horizontally movable shuttle having a tool gripping member for carrying a tool from the outer matrix ring to a station adjacent said spindle, means on said shuttle supporting said member for movement vertically with respect to said shuttle between a retracted position and an extended position for reaching a second tool in the inner matrix ring, and power means for translating said shuttle horizontally between said matrix rings and said station and for moving said tool gripping member vertically between said positions.

14. In a machine tool having a spindle and tool changing apparatus for exchanging a tool in said spindle with a new tool, tool storage means including concentric matrix rings presenting tools at vertically spaced positions respectively to said tool changing apparatus, said tool changing apparatus including a horizontally movable shuttle having a tool gripping member for carrying a tool from the outer matrix ring to a station adjacent said spindle, means on said shuttle supporting said members for movement vertically with respect to said shuttle between a retracted position and an extended position for reaching a second tool in the inner matrix ring, power means for translating said shuttle in either horizontal direction between said stations, power means carried by said shuttle for moving said tool gripping member vertically in either direction between said positions, and control means for operating said power means respectively.

15. In a machine tool having a spindle and tool changing apparatus for exchanging a tool in said spindle with a new tool, tool storage means presenting tools at different positions to said tool changing apparatus, said tool changing apparatus including a horizontally movable shuttle for carrying a tool from a shuttle station adjacent one of said tool storage positions to a station adjacent said spindle, a member carried by said shuttle and movable vertically with respect to said shuttle between a retracted position and an extended position for reaching a second tool at another of said storage positions, power means carried by said shuttle for moving said member, and control means carried by said shuttle and operated by fixed means carried adjacent said vertically movable member for gradually decelerating said power means to slow down said member gradually upon movement thereof in either direction between said positions.

16. In a machine tool having a translatable saddle, a table movable crosswise on said saddle and adapted to support a workpiece, and power means for positioning said saddle and table to move said workpiece, the improvement comprising a headstock for rotating a cutting tool to perform machining operations on said workpiece upon movement thereof including: a horizontal power driven spindle sleeve carrying an axially slidable spindle bar adapted to support said tool, power means for translating said spindle bar within said sleeve selectively operable gauge means for stopping the translation of said spindle bar in any one of a plurality of preset incrementally spaced positions.

17. In a machine tool having a translatable saddle, a table movable crosswise on said saddle and adapted to support a workpiece, and power means for positioning said saddle and table to move said workpiece, the improvement comprising a headstock for rotating a cutting tool to perform machining operations on said workpiece upon movement thereof including: a horizontal power driven spindle sleeve carrying an axially slidable spindle bar adapted to support said tool, power means for translating said spindle bar within said sleeve, selectively operable gauge means for stopping the translation of said spindle bar in any one of a plurality of preset incrementally spaced positions, and tool transfer means carried by said headstock and operative to support a tool in axial alignment with said spindle bar for transfer or removal from said bar upon axial movement of the latter in forward or reverse directions respectively to or from a selected one of its predetermined positions within said sleeve.

18. In a machine tool having a spindle and tool changing apparatus for changing a tool in said spindle with a new tool, a tool storage means including a movable matrix for supporting a plurality of tools, an upright column carrying said movable matrix, said matrix comprising a rotatable member defining concentric rings of equally spaced tool storage sockets, the outer ring being rotatably supported by the inner ring, said inner ring being rotatably supported by means on said column, a hydraulic power unit for selectively rotating one of said rings at a positioning rate to move a tool in a socket thereof to a tool transfer station for transfer by said tool changing apparatus, and control means for operating said hydraulic power unit including means for decelerating said power unit from said positioning rate so as to stop the moving ring within the distance between adjacent sockets therein.

19. In a machine tool having a spindle and tool changing apparatus for changing a tool in said spindle with a new tool, a tool storage means including a movable matrix for supporting a plurality of tools, an upright column carrying said movable matrix, said matrix comprising a rotatable member defining a ring of equally spaced tool storage sockets, a hydraulic power unit for rotating said member at a positioning rate to move a tool in a socket thereof to a tool transfer station for transfer by said tool changing apparatus, and control means for operating said hydraulic power unit including means for decelerating said power unit from said positioning rate so as to stop said member within the distance between adjacent sockets therein.

20. In a machine tool having a spindle and tool changing apparatus for changing a tool in said spindle with a new tool, a tool storage means including a movable matrix for supporting a plurality of tools, an upright column carrying said movable matrix, said matrix comprising a rotatable ring defining equally spaced tool storage sockets, a power unit for rotating said ring to move tools in sockets thereof to a tool transfer station for transfer by said tool changing apparatus, and means for controlling said power unit including a matrix position designating system having a distinctive cam stack associated with each tool socket, each cam stack representing by its cam configuration a particular matrix angular position, a reading device fixed one socket ahead of said tool transfer station to read the configuration of each of said cam stacks upon rotation of said matrix ring before the associated tool socket reaches said tool transfer station, said reading device producing a signal designating the particular matrix angular position represented by each cam stack as each is read upon rotation of said matrix ring, and means responsive to a signal from said reading mechanism representing a programmed matrix ring position for decelerating said power unit within the distance between adjacent sockets and for stopping said matrix ring at said programmed position with a particular tool socket at said transfer station.

21. In a machine tool having a spindle and tool changing apparatus for changing a tool in said spindle with a new tool, a tool storage means including a movable matrix for supporting a plurality of tools, an upright column carrying said movable matrix, said matrix comprising concentric rotatable rings defining spaced tool storage sockets, a power unit for rotating said rings to move tools in sockets thereof to a tool transfer station for transfer by said tool changing apparatus, and means including a differential drive operated by said power unit for selectively rotating said rings including a pair of rotatable reaction members connected respectively to said matrix rings, and drive elements operated by said power unit and associated with said reaction members so that upon lock up of one reaction member to fix one ring against rotation the other reaction member is operated by its drive elements to rotate the connected matrix ring.

22. In a machine tool having a frame, a headstock mounted on said frame for vertical movement and including a horizontal spindle supported for powered rotation and axial translation within said headstock, said spindle having a socket for tools, automatic apparatus for changing tools in said spindle comprising storage means for tools, a shuttle for carrying a tool from said storage means to an exchange position adjacent said spindle, a rotatable arm for carrying a tool from said shuttle to a position axially aligned with said spindle, power means for rotating said arm, and selectively operable gauge means operable upon translation of said spindle in a forward direction within said headstock for stopping the translation of said spindle in any one of a plurality of preset spaced positions including (1) a tool transfer position in which a tool held by said arm is inserted into said spindle socket and (2) a plurality of different machining positions spaced from said tool transfer position in which a work piece is machined upon movement thereof relative to said spindle.

23. In a machine tool having a frame, a headstock mounted on said frame for vertical movement and including a horizontal spindle supported for powered rotation and axial translation within said headstock, said spindle having a socket for tools, automatic apparatus for changing tools in said spindle comprising storage means for tools, a shuttle for carrying a tool from said storage means to an exchange position adjacent said spindle, a rotatable arm for carrying a tool from said shuttle to a position axially aligned with said spindle socket, power means for rotating said arm, means operable upon translation of said spindle in a forward direction within said headstock for locating said spindle in predetermined extended positions including a tool transfer position in which a tool held by said arm is inserted into said spindle socket, and control means associated with said power means and said locating means for rotating said arm to leave said tool in said spindle socket and thereafter for translating said spindle to a different extended position for machining.

References Cited by the Examiner
UNITED STATES PATENTS

| | | | |
|---|---|---|---|
| Re. 25,583 | 5/1964 | Brainard | 29—568 |
| 2,956,454 | 10/1960 | Hansen. | |
| 2,957,393 | 10/1960 | Kampmeier | 90—11 |
| 3,073,024 | 1/1963 | Hutchens. | |
| 3,103,144 | 9/1963 | Walter | 77—3 |

RICHARD H. EANES, JR., *Primary Examiner.*